United States Patent
Tsukuda et al.

(10) Patent No.: US 6,511,774 B1
(45) Date of Patent: *Jan. 28, 2003

(54) SEPARATOR FOR NONAQUEOUS ELECTROLYTE BATTERIES, NONAQUEOUS ELECTROLYTE BATTERY USING IT, AND METHOD FOR MANUFACTURING SEPARATOR FOR NONAQUEOUS ELECTROLYTE BATTERIES

(75) Inventors: Takahiro Tsukuda, Tokyo (JP); Haruyoshi Funae, Tokyo (JP)

(73) Assignee: Mitsubishi Paper Mills Limited, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/142,690

(22) PCT Filed: Jan. 14, 1998

(86) PCT No.: PCT/JP98/00113
§ 371 (c)(1),
(2), (4) Date: Sep. 14, 1998

(87) PCT Pub. No.: WO98/32184
PCT Pub. Date: Jul. 23, 1998

(30) Foreign Application Priority Data

| Jan. 16, 1997 | (JP) | 9-005661 |
| Aug. 20, 1997 | (JP) | 9-223544 |
| Oct. 24, 1997 | (JP) | 9-292237 |
| Nov. 26, 1997 | (JP) | 9-324729 |

(51) Int. Cl.⁷ .............................................. H01M 2/16
(52) U.S. Cl. ...................... 429/247; 429/249; 429/142
(58) Field of Search ................ 429/247, 249, 429/251, 252, 142, 145, 248, 250, 129; 361/500

(56) References Cited

U.S. PATENT DOCUMENTS

| 4,731,311 A | * | 3/1988 | Suzuki et al. | 429/213 |
| 5,388,025 A | * | 2/1995 | Davis et al. | 361/502 |
| 5,736,465 A | * | 4/1998 | Stahl et al. | 428/298 |
| 5,962,161 A | * | 10/1999 | Zucker | 429/142 |

FOREIGN PATENT DOCUMENTS

| JP | 57-80670 | 5/1982 |
| JP | 59-44750 | 10/1984 |
| JP | 63-102161 | 5/1988 |
| JP | 63-175350 | 7/1988 |
| JP | 63-257180 | 10/1988 |
| JP | 1-304933 | 12/1989 |
| JP | 01-304933 | 12/1989 |
| JP | 3-124865 | 5/1991 |
| JP | 5-151949 | 6/1993 |
| JP | 6-196199 | 7/1994 |
| JP | 7-220710 | 8/1995 |
| JP | 7-302584 | 11/1995 |
| JP | 8-111214 | 4/1996 |
| JP | 9-213296 | 8/1997 |
| JP | 63-257180 | 10/1998 |

* cited by examiner

Primary Examiner—Stephen Kalafut
Assistant Examiner—R Alejandro
(74) Attorney, Agent, or Firm—Paul E. White, Jr.; Manelli Denison & Selter PLLC

(57) ABSTRACT

The present invention provides a separator for non-aqueous electrolyte batteries which neither breaks nor slips off at the time of fabrication of battery, gives excellent battery fabricability, causes no internal short-circuit caused by contact between electrodes even if the electrodes are externally short-circuited, can inhibit ignition of battery and produces high energy density and excellent cycle life, and further provides a non-aqueous electrolyte battery using the separator and a method for manufacturing the separator. That is, the present invention relates to a separator for non-aqueous electrolyte batteries which comprises a porous base containing at least one member selected from a porous film, a woven fabric or nonwoven fabric containing an organic fiber and a paper and an organometallic compound applied to the porous base; a method for the manufacture of the separator for non-aqueous electrolyte batteries which comprises allowing said porous base to contact with a solution of organometallic compound by impregnation, coating or spraying, followed by drying or curing with heating to apply the organometallic compound to the porous base; and a non-aqueous electrolyte battery using the separator.

15 Claims, No Drawings

SEPARATOR FOR NONAQUEOUS ELECTROLYTE BATTERIES, NONAQUEOUS ELECTROLYTE BATTERY USING IT, AND METHOD FOR MANUFACTURING SEPARATOR FOR NONAQUEOUS ELECTROLYTE BATTERIES

This application is the national phase of international application PCT/JP98/00113 filed Sep. 14, 1998 which designated the U.S.

TECHNICAL FIELD

The present invention relates to a separator for non-aqueous electrolyte batteries which provides superior processability in fabrication of batteries, does not shrink or burn even when heat is generated due to external short-circuit of electrodes, causes no internal short-circuit owing to contact between electrodes, can inhibit ignition of batteries, and can provide high energy density and excellent cycle life; a non-aqueous electrolyte battery using the same; and a method for manufacturing the separator for non-aqueous electrolyte batteries.

BACKGROUND ART

Hitherto, porous materials comprising polyolefins such as polypropylene and polyethylene have been used as separators for non-aqueous electrolyte batteries such as lithium secondary batteries. For example, JP-A-6-325747 discloses a microporous film comprising a high-molecular weight polyethylene having an intrinsic viscosity ($\eta$) of 5 dl/g or higher as a separator for non-aqueous electrolyte batteries. JP-A-6-163023 discloses a microporous film comprising a mixture of polyethylene and ethylene-propylene rubber as separators of lithium primary and secondary batteries.

These separators have shutdown function for the prevention of ignition of batteries. The shutdown function is a function to prevent melting and ignition of Li upon the battery temperature reaching 180° C. in case the electrodes are short-circuited and a great electric current flows to generate heat. Specifically, before occurrence of the ignition of Li, separators are molten and openings thereof are clogged, whereby the battery reaction is stopped to inhibit generation of heat.

For example, the batteries are designed so that when a porous material of polyethylene is used as separators, the shutdown takes place at about 120° C., and when a porous material of polypropylene is used as separators, the shutdown takes place at about 140° C., whereby generation of heat in the battery is stopped to inhibit increase of temperature. However, in the case of generation of excess heat which cannot be suppressed by the shutdown function, melting of the separators proceeds to cause cracking due to complete melting or fusion of the separators, resulting in contact between electrodes, and, as a result, the short-circuit current again flows to cause generation of heat and ignition of battery.

Furthermore, since these separators are low in tear strength and penetration strength, they may be ruptured or broken through by projections of electrodes or by accidents at the time of fabrication of batteries.

JP-A-5-151949 discloses multi-layer separators for batteries which comprise a laminate of a polyolefin microporous thin film and a polyolefin nonwoven fabric, the laminate being hot pressed at a temperature lower than the melting points of the materials constituting the thin film and the nonwoven fabric. However, since the materials of the laminate are all polyolefins, they are inferior in heat resistance and cannot prevent internal short-circuit in case the temperature rises to such an extent as cannot be suppressed by the shutdown function.

For the improvement of heat resistance of separators, it is effective to add inorganic materials such as glass, alumina and ceramics, or resins and fibers superior in heat resistance. However, these materials generally contain polar groups such as hydroxyl group, silanol group and carboxyl group which adversely affect battery characteristics and, thus, these materials cannot be used as they are.

For increasing the strength of separators, the following methods are effective: a method of mixing with pulp to utilize the interlocking of pulp; a method of bonding with polyvinyl alcohol, ethylene-vinyl alcohol copolymer or the like to increase the strength; and a method of making composites with woven fabric, nonwoven fabric, paper or the like. However, pulp, polyvinyl alcohol and ethylene-vinyl alcohol copolymer contain hydroxyl group which adversely affects battery characteristics, and if woven fabric, nonwoven fabric and paper comprises materials containing polar groups such as hydroxyl group, silanol group and carboxyl group which adversely affect battery characteristics, when these are used as separators for non-aqueous electrolyte batteries, the battery characteristics such as energy density and cycle life are considerably deteriorated.

For example, JP-A-7-220710 discloses a separator for batteries, characterized by comprising a paper mainly composed of cellulose fibers and a polyethylene microporous film having micropores, for the purpose of providing a separator for batteries which blockades between positive electrode and negative electrode before the rise of temperature inside the battery reaches a dangerous zone and, besides, is diminished in the danger of rupture when the temperature further rises, and keeps insulation between positive electrode and negative electrode.

For providing a separator for batteries having good shutdown properties and heat resistance, JP-A-9-213296 discloses a battery separator, characterized by a sheet of laminate structure comprising a heat-unfusible microporous layer of a sheet made of a mixture of cellulose fibers and heat-unfusible synthetic fiber fibrils finely divided to a water retentivity of 210–450% and a heat-fusible micro-porous layer comprising a polyolefin resin, these layers being superposed.

However, the separators of JP-A-7-220710 and JP-A-9-213296 suffer from the problem that since hydroxyl group contained in cellulose fibers adversely affects the battery characteristics, energy density and cycle life are considerably deteriorated when used as separators for non-aqueous electrolyte batteries.

For providing a separator which prevents internal short-circuit caused by the contact between positive and negative electrodes, JP-A-7-302584 discloses a separator for batteries, characterized by comprising a nonwoven fabric containing at least 50% by weight of micro-fibrillated fibers of an organic synthetic polymer which have an average fiber length of 0.2–1.5 mm and an average fiber diameter of 0.05–1 μm.

However, since the microfibrillated fibers comprise an organic synthetic polymer, binding force of the fibers per se is small, and when a porous base is made using at least 50% by weight, especially 100% of the fibers, the fibers fall off from the porous base or the base is considerably low in tear strength and penetration strength to cause problem in rollability together with electrodes.

JP-A-2-170346 discloses an inorganic non-aqueous electrolyte battery having a negative electrode of an alkali metal, a positive electrode comprising a porous molded body mainly composed of carbon, a separator interposed between the negative electrode and the positive electrode and an electrolyte containing a solvent of an oxyhalide which is a positive electrode active material, wherein said separator comprises a glass fiber nonwoven fabric made using a binder mainly composed of polyethyl acrylate or a copolymer of ethyl acrylate and acrylonitrile and containing an organosilane compound.

In this case, the organosilane compound is used in order to improve binding force between the binder and the glass fibers and further increase tensile strength of the glass fiber nonwoven fabric by adding to the binder which is used for increasing tensile strength of the glass fiber nonwoven fabric.

The glass fiber nonwoven fabric here is a nonwoven fabric mainly composed of glass fibers. Therefore, when the tensile strength is increased with binder, rigidity is also increased, and, hence, the nonwoven fabric is readily broken and rollability together with electrodes is inferior, resulting in inferior battery fabricability.

Furthermore, the effect of the organosilane compound is that a part of the organosilane compound dissolves into the electrolyte and prevents densification of the alkali metal halide film which is produced on the surface of negative electrode by the reaction of oxyhalide as a positive electrode active material with alkali metal of the negative electrode and, as a result, reduction of voltage at the initial discharge after storage at high temperatures or for a long time can be inhibited.

Accordingly, the above technique is clearly different from the technique of improving heat resistance of the separator by applying an organometallic compound to a porous base constituting the separator for non-aqueous electrolyte batteries or by forming a film and of improving battery characteristics such as energy density and cycle life by blocking the polar group which adversely affects the battery characteristics.

For the purpose of providing a secondary battery which can be prevented from short-circuit of negative electrode and positive electrode inside the battery even if dendrite is formed at the negative electrode, JP-A-6-196199 discloses a secondary battery comprising a negative electrode composed of a negative electrode active material and a positive electrode composed of a positive electrode active material which are separated by a separator, wherein at least a multi-layer metal oxide is provided between the positive electrode and the negative electrode.

In the above battery, the short-circuit of the negative electrode and the positive electrode in the battery can be inhibited even if dendrite is formed at the negative electrode by using, as a part of separator, a multi-layer metal oxide film formed by molding a bimolecular film forming compound in a mold, and the multi-layer metal oxide film per se serves as a separator. However, the multi-layer metal oxide film is very low in strength and it cannot be used alone as a separator. Therefore, the multi-layer metal oxide film must be formed as a part of a general separator or a porous base used as a support or it must be interposed between other separators. For this reason, there are problems that the separators or porous bases usable as supports are limited to the poly-olefin resins or fluorocarbon resins and therefore they are low in tear strength and penetration strength, and the separators are crushed or broken at the time of fabrication of batteries, and besides are inferior in heat resistance or cannot provide sufficient energy density.

Moreover, the multi-layer metal oxide film per se is a separator, and this is clearly different from the technique of directly reacting an organometallic compound with a polar group such as hydroxyl group, silanol group or carboxyl group contained in the porous base constituting a separator for non-aqueous electrolyte batteries to bond the organometallic compound to the porous base or to form a film, thereby to improve heat resistance of the separator and improve battery characteristics such as energy density and cycle life.

JP-A-6-168739 discloses a secondary battery comprising at least a negative electrode, a separator, a positive electrode, an electrolyte, a collector and a battery case, wherein at least the surface of the positive electrode that faces the negative electrode is covered with one or two or more layers of films selected from an insulator, a semiconductor and a composite of an insulator and a semiconductor which are permeable to ions which participate in the battery reaction.

According to this technique, even if dendrite of lithium or zinc grows at the time of charging, short-circuiting of negative electrode and positive electrode is inhibited by forming on the surface of positive electrode a film of an insulator, a semiconductor or a composite of an insulator and a semiconductor permeable to ions which participate in battery reaction. This is clearly different from the technique of applying an organometallic compound to a porous base constituting a separator for non-aqueous electrolyte batteries or forming a film of the organometallic compound to improve heat resistance of the separator and block the polar group which adversely affects the battery characteristics, thereby to improve battery characteristics such as energy density and cycle life.

For the purpose of providing a separator which is excellent in chemical resistance, heat resistance and hydrophilicity, causes no uneven wetting and can attain improvement of characteristics of apparatuses for electrochemical reaction, JP-A-8-250101 discloses a separator for apparatuses for electrochemical reaction, characterized by comprising a porous body of a composite of a metal oxide and a polymer, said porous body being produced by covering at least fine fibers, fine knots or wall surface of pores of a polymer porous body having interconnecting pores with a metal oxide comprising a dry body of a metal oxide hydrous gel formed by gelling reaction of hydrolyzable metal-containing organic compound.

This separator suffers from the problem that since the metal oxide contains a slight amount of water, energy density or cycle life is deteriorated due to the water contained in the metal oxide when it is used as a separator for non-aqueous electrolyte batteries.

JP-A-3-124865 discloses a heat resistant fiber nonwoven fabric made by bonding the fibers with a hydrolyzed condensate comprising an acid, water and one or two or more compounds selected from methyltrimethoxysilane, methyltriethoxysilane, ethyltrimethoxysilane and ethyltriethoxysilane. Moreover, as a different use, JP-A-5-64712 discloses a glass fiber filter paper for heat resistant air filters which contains a condensate produced from an alkoxysilane in an amount of 1–7% by weight based on the total weight of the filter paper. As a different use, JP-A-7-328355 discloses a dust-removing filter made of glass fibers the surface of which is treated with an organosilane having a hydrolyzable group.

These heat resistant fiber nonwoven fabric, glass fiber filter paper for heat resistant air filter and dust-removing filter made of glass fibers have problems in fabricability of batteries when they are used as separators of non-aqueous electrolyte batteries. That is, since they are poor in interlaminar strength and folding strength, when the separator is rolled together with electrodes, they are readily crashed through or broken by the projection of the electrodes or by accident and, besides, they are apt to generate dust due to friction or shock and are readily broken once a fold is given. Even if they can be rolled, interlaminar separation is apt to occur, thickness becomes uneven, and they lack flexibility. Thus, the separators are inferior in adhesion to electrodes and may slip off from the electrodes to produce a space, resulting in non-uniform electric resistance inside the battery. Therefore, these separators, as they are, cannot be used as separators of non-aqueous electrolyte batteries.

The inventors filed WO/96/30954 on nonwoven fabrics for separators of non-aqueous electrolyte batteries and non-aqueous electrolyte batteries using the same. The nonwoven fabrics for separators of non-aqueous electrolyte batteries disclosed in the above patent application has the following features: the thickness uneven index Rpy in machine direction is 1000 mV or less; they have good adhesion to electrodes and give superior battery fabricability such as rollability with electrodes; even if heat is generated due to external short-circuit of electrodes, no internal short-circuit occurs which is caused by the contact between electrodes brought about by shrinking or burning of the nonwoven fabrics, and thus ignition of battery can be prevented; and battery shelf stability is excellent.

However, even said nonwoven fabrics for separators of non-aqueous electrolyte batteries cannot still provide satisfactory energy density and cycle life.

The present invention solves the above problems in the prior art. That is, the object of the present invention is to provide a separator for non-aqueous electrolyte batteries which neither breaks nor slips off to produce no spaces between electrodes at the time of fabrication of battery, is good in rollability with electrodes and results in excellent battery fabricability, does not shrink or burn even if external short-circuit of electrodes occurs, causes no internal short-circuit which is caused by the contact between electrodes, to prevent ignition of battery, and gives a high energy density and an excellent cycle life. Further objects are to provide a non-aqueous electrolyte battery using the separator and a method for manufacturing the separator.

The present inventor have conducted intensive research in an attempt to solve the above problems and accomplished the present invention.

DISCLOSURE OF INVENTION

That is, the present invention relates to a separator for non-aqueous electrolyte batteries which comprises a porous base comprises at least one material selected from a porous film, a woven fabric and nonwoven fabric containing organic fibers and a paper and an organometallic compound applied to the porous base.

It is preferred that the porous film has a maximum pore diameter of 10 $\mu$m or less measured by bubble point method specified in ASTM F-316-80.

It is preferred that the porous base has a maximum pore diameter of 20 $\mu$m or less measured by bubble point method specified in ASTM F-316-80.

It is preferred that the nonwoven fabric or paper has a maximum pore diameter of 20 $\mu$m or less measured by bubble point method specified in ASTM F-316-80.

It is preferred that the porous base contains inorganic fibers.

It is preferred that the inorganic fibers are micro-glass fibers comprising a silica glass containing 99% by weight or more of silicon dioxide (in terms of $SiO_2$) or an E glass containing 1% by weight or less of sodium oxide (in terms of $Na_2O$).

It is preferred that at least one of organic fibers are heat resistant organic fibers having a melting point or a heat decomposition temperature of 250° C. or higher.

It is preferred that at least a part of the organic fiber are fibrillated to 1 $\mu$m or less in fiber diameter.

It is preferred that the organic fibers at least a part of which are fibrillated to 1 $\mu$m or less in fiber diameter are at least one kind of fibers selected from vegetable fibers, vegetable fiber pulps, bacteria celluloses produced by microorganisms, rayons, polyolefin fibers, polyamide fibers, aramid fibers and polyarylate fibers.

It is preferred that the porous base contains polyvinyl alcohol.

It is preferred that the porous base is subjected to pressing treatment or hot pressing treatment.

It is preferred that the organometallic compound is at least one compound selected from organosilicon compound, organotitanium compound, organoaluminum compound, organozirconium compound and organozirco-aluminate compound.

It is preferred that the organometallic compound is an organosilicon compound.

It is preferred that the organosilicon compound is at least one compound selected from organosilanes or organopolysiloxanes having at least one hydrolyzable group or functional group selected from chlorine group, fluorine group, acetoxy group, alkoxy group, vinyl group, amino group, epoxy group, mercapto group and methacryl group.

The method for producing a separator for non-aqueous electrolyte batteries according to the present invention is characterized in that a porous base comprising at least one member selected from a porous film, a woven fabric and nonwoven fabric containing organic fibers and a paper is allowed to contact with a solution of an organometallic compound by a method of impregnation, coating or spraying and is dried or cured by heating to apply the organometallic compound to the porous base.

In the method for producing a separator for non-aqueous electrolyte batteries according to the present invention, at least one porous base (A) selected from a porous film, a woven fabric and nonwoven fabric containing organic fibers and a paper or (A) and a porous base (B) containing no organic fibers are previously allowed to contact with a solution of an organometallic compound by a method of impregnation, coating or spraying and dried or cured by heating to apply the organometallic compound to the porous base to make a composite (C) comprising a combination of (A) or a combination of (A) and (B).

In the method for producing a separator for non-aqueous electrolyte batteries according to the present invention, a composite (C) comprising a combination of at least one porous base (A) selected from a porous film, a woven fabric and nonwoven fabric containing organic fibers and a paper or a combination of (A) and a porous base (B) containing no organic fibers is made and then this composite (C) is allowed to contact with a solution of an organometallic compound by a method of impregnation, coating or spraying and dried or cured by heating to apply the organometallic compound to the composite.

In the method for producing a separator for non-aqueous electrolyte batteries according to the present invention, a wet sheet obtained by wet paper making process or the sheet after dried is allowed to contact with a solution of an organometallic compound by a method of impregnation, coating or spraying and dried or cured by heating to apply the organometallic compound to the sheet.

In the method for producing a separator for non-aqueous electrolyte batteries according to the present invention, a fiber slurry containing an organometallic compound is beaten or macerated and then the fiber slurry alone or a mixed slurry comprising said fiber slurry and other fiber slurry is subjected to wet paper making process and is dried or cured by heating to apply the organometallic compound to the resulting sheet.

In the method for producing a separator for non-aqueous electrolyte batteries according to the present invention, a fiber slurry containing an organometallic compound is beaten or macerated and then the fiber slurry alone or a mixed slurry comprising said fiber slurry and other fiber slurry is subjected to wet paper making and the resulting wet sheet or the sheet after dried is allowed to contact with a solution of an organometallic compound by impregnation, coating or spraying, followed by drying or curing with heating to apply the organometallic compound to the resulting sheet.

In the method for producing a separator for non-aqueous electrolyte batteries according to the present invention, the porous base is subjected to pressing treatment or hot pressing treatment.

In the method for producing a separator for non-aqueous electrolyte batteries according to the present invention, pressing treatment or hot pressing treatment is carried out to adjust the maximum pore diameter to 20 $\mu$m or less measured by bubble point method specified in ASTM F-316-80.

BEST MODE FOR CARRYING OUT THE INVENTION

The separator for non-aqueous electrolyte batteries of the present invention will be explained in detail.

The porous base used in the present invention comprises at least one material selected from a porous film, a woven fabric and nonwoven fabric containing organic fibers and a paper. That is, the base comprises one of these materials, a composite comprising a combination of these materials, or a composite comprising at least one of these materials and a porous base containing no organic fibers.

Materials constituting the porous film used in the present invention include, for example, polyolefin resins and fluorocarbon resins, but they are not limited.

The porous film used in the present invention preferably has a maximum pore diameter of 10 $\mu$m or less as measured by the bubble point method specified in ASTM F-316-80. Since the pores of the porous film pierce through the film linearly and in the z direction at the shortest direction, if the maximum pore diameter is more than 10 $\mu$m, dendrites produced by the repetition of charging and discharging or electrode active materials falling off due to some shock readily pass through the pores of the separator to cause internal short-circuit. Therefore, the smaller pore diameter is the better as far as ion can permeate through the separator, but if the pore diameter is smaller than needed, the electrolyte permeation properties or retention properties are considerably deteriorated to result in extreme deterioration of battery characteristics. Thus, the pore diameter is preferably 0.001 $\mu$m or more.

Being different from the pores of the porous film, those of woven fabric, nonwoven fabric and paper used in the present invention are not linear and are intricate. Especially, the pores of the nonwoven fabric and paper comprise complicated passages due to the effect of disordered orientation or interlocking of fibers, and, hence, the dendrite or the electrode active material falling off is more difficult to be passed therethrough than in the case of the porous film.

As the organic fibers contained in the woven fabric or nonwoven fabric used in the present invention, mention may be made of single fibers, composite fiber and various heat-fusible fibers comprising resins such as wood pulps, non-wood pulps, rayons, celluloses, cuprammonium rayons, polynosics, acetates, acrylics, polyolefins, polyesters, polyamides, polyimides, polyamide-imides, polyether ketones, polyether sulfones, polyvinyl alcohols and ethylene-vinyl alcohol copolymers.

The materials constituting the nonwoven fabric used in the present invention, mention may be made of, in addition to the organic fibers, inorganic fibers, inorganic additives and resins superior in heat resistance, such as glass fibers, micro-glass fibers, alumina fibers, alumina-silica fibers, ceramics fibers, zirconia fibers, rock wool, Tyrano fiber, silicon carbide fibers, potassium titanate fibers, alumina whiskers, aluminum borate whiskers, colloidal alumina, colloidal silica, epoxy resins and fluorocarbon resins.

Papers used in the present invention include, for example, so-called papers mainly composed of wood pulp, and non-wood fibers or non-wood pulps such as straw, bagasse, paper mulberry, mitsumata (*Edgeworthia papyrifera*), Manila hemp, esparto, cotton linter, ganpi (*Wikstroemia sikokiana* Fr. Et Sav.), jute, bamboo, ditch reed, papyrus, kenaf, and ramie, and filter papers.

As far as the effect to block the polar groups is not reduced so much, the nonwoven fabrics and papers used in the present invention may contain various adhesives such as thermoplastic resins, e.g., vinyl acetate resins, vinyl chloride resins, polyvinyl alcohol resins, polyvinyl acetal resins, acrylic resins, polyamide resins and ethylene-vinyl acetate copolymers, thermosetting resins, e.g., urea resins, melamine resins, phenolic resins, epoxy resins, polyurethane resins, polyester resins, polyaromatic resins and resorcinol resins, and elastomers such as chloroprene elastomers, nitrile rubber elastomers, butyl rubber elastomers, polypropylene elastomers and silicone rubber elastomers.

The porous base used in the present invention preferably comprises a nonwoven fabric or a paper because the pores are formed by disordered orientation and complicated interlocking of fibers, and, hence, the base is excellent in retention of electrolyte; dendrite or electrode active material falling off is difficult to pass through the base; the base is excellent in heat resistance; occurrence of internal short-circuit can be inhibited; the base is high in tear strength and penetration strength; and separators for non-aqueous electrolyte batteries excellent in rollability with electrodes can be obtained.

It is preferred that the porous base in the present invention comprises particularly a nonwoven fabric, because it swells a little after immersed in the electrolyte and is excellent in dimensional stability and, therefore, area of electrodes to be inserted in the battery can be gained and thus non-aqueous electrolyte batteries of high capacity can be produced.

When the porous base in the present invention has a maximum pore diameter of 20 $\mu$m or less as measured by the bubble point method specified in ASTM F-316-80, it is excellent in retainability of electrolyte and charging and discharging can be stably repeated. As a result, excellent cycle life and shelf stability of battery can be obtained.

Pore diameter of the nonwoven fabric and paper used in the present invention may be less than that which can be visually noticed and has no special limitation, but the maximum pore diameter is preferably 20 $\mu$m or less, more preferably 10 $\mu$m or less measured by the bubble point method specified in ASTM F-316-80.

When the maximum pore diameter is 20 $\mu$m or less, especially 10 $\mu$m or less, since the nonwoven fabric or paper is excellent in retainability of electrolyte and charging and discharging can be stably repeated, excellent cycle life and shelf stability of battery can be obtained.

As the porous base containing no organic fibers, mention may be made of a nonwoven fabric and a mat composed of inorganic fibers, inorganic powders, resins or the like.

The composite comprising a combination of a porous film, a woven fabric or nonwoven fabric containing organic fibers, and a paper and the composite comprising a combination of at least one of them and a porous base containing no organic fibers include a multi-layer material made without bonding the layers and a multi-layer material made by partially or wholly bonding the layers, and these can be combined depending on the purpose.

When the porous base in the present invention comprises the above composite, a multi-functional separator for non-aqueous electrolyte batteries is obtained.

For example, when the porous base used in the present invention comprises a composite of a porous film of polypropylene resin or polyethylene resin and a paper or a nonwoven fabric excellent in heat resistance, there is obtained a separator for non-aqueous electrolyte batteries which is high in safety with having both the shutdown function of the porous film and the heat resistance of the paper or non-woven fabric.

Furthermore, when a porous film comprising polypropylene resin or polyethylene resin is bonded to a woven fabric, nonwoven fabric or paper partially or at the whole surface to form a composite, there is obtained a separator for non-aqueous electrolyte batteries which has the shutdown function of the porous film and is high in strength, good in rollability together with electrodes and excellent in battery fabricability.

When the porous base used in the present invention comprises a composite of a nonwoven fabric mainly composed of polypropylene resin or polyethylene resin and a paper or a nonwoven fabric excellent in heat resistance, there is also obtained a separator for non-aqueous electrolyte batteries which has both the shutdown function of polypropylene or polyethylene and the heat resistance of the paper or nonwoven fabric and is high in strength, good in rollability with electrodes and excellent in battery fabricability.

Especially, when the porous base used in the present invention contains a non-woven fabric, there is obtained a separator for non-aqueous electrolyte batteries having many functions such as excellent electrolyte retention, high tear strength, penetration strength and heat resistance, and excellent dimensional stability after immersed in the electrolyte. Thus, this is preferred.

Content of organic fibers in the porous base containing organic fibers in the present invention is preferably 5–100% by weight, more preferably 10–100% by weight. If the content of organic fibers is less than 10% by weight, especially less than 5% by weight, thickness of the porous base can hardly be reduced and the separator is low in folding strength and penetration and has problems in adhesion to electrodes and rollability with electrodes.

As the inorganic fibers used in the present invention, mention may be made of alumina fibers, alumina-silica fibers, rock wool, glass fibers, micro-glass fibers, zirconia fibers, potassium titanate fibers, alumina whiskers, aluminum borate whiskers and the like.

As the alumina fibers, alumina-silica fibers and rock wool, preferred are those having a fiber diameter of less than several $\mu$m and a fiber length of several tens of $\mu$m to several hundreds of $\mu$m for making a separator for non-aqueous electrolyte batteries which has a uniform thickness. The fiber diameter is more preferably 3 $\mu$m or less.

The alumina fibers are fibers mainly composed of alumina. The methods for producing the alumina fibers include the inorganic salt method which comprises spinning a spinning solution comprising a mixture of an aqueous solution of an aluminum salt and a water-soluble polysiloxane and firing the resulting fibers at 1000° C. or higher in the air, the sol method which comprises spinning an alumina sol or silica sol and firing the resulting fibers, the prepolymer method which comprises dry-spinning a mixture of a solution containing polyaluminoxane and a silicic acid ester and firing the resulting precursor fibers at 1000° C. or higher in the air, and the slurry method which comprises dry-spinning a slurry containing $\alpha$-$Al_2O_3$ fine powders of 0.5 $\mu$m or less, firing the resulting precursor fibers at 1000° C. or higher and then passing the fibers through a gas flame of 1500° C. to sinter the crystal grains.

The alumina fibers are commercially available, for example, in the name of Saffil from ICI (England) and Denka alsen from Denki Kagaku Kogyo K.K.

The alumina-silica fibers are fibers of 40–60% in alumina content and 60–40% in silica content, and are produced, for example, by the following methods. An alumina-silica raw material comprising kaolin calcination product, bauxite alumina, siliceous sand, silica powder and the like to which, if necessary, borate glass, zirconia, chromium oxide and the like are added is molten at a high temperature and made into fibers by blowing method which comprises blowing compressed air or steam jet against the melt or spinning method which utilizes centrifugal force of a rotor rotating at a high speed.

The rock wool is produced, for example, by the following method. A blast furnace slag as a main raw material and silica, dolomite, limestone and the like are molten by heating at 1500–1600° C. in an electric furnace and the resulting homogeneous melt is dropped on a high-speed rotator at 1400° C. to make it into fibers.

The micro-glass fibers are superfine glass fibers produced by steam spraying method, spinning method, flame introduction method, rotary method and the like, and generally have an average fiber diameter of 5 $\mu$m or less.

As the micro-glass fibers, mention may be made of those which comprise borosilicate glass containing, as constitutive components, silicon dioxide ($SiO_2$), sodium oxide ($Na_2O$), calcium oxide (CaO), aluminum oxide ($Al_2O_3$), magnesium oxide (MgO), potassium oxide ($K_2O$) and the like, E glass containing substantially no sodium oxide, and silica glass comprising high purity silicon dioxide. However, sodium is substituted for lithium which is an active material to cause decrease of capacity during a long term storage of non-aqueous electrolyte batteries. Therefore, preferred are those which comprise E glass or silica glass.

As micro-glass fibers comprising E-glass and containing no sodium oxide, mention may be made of, for example, E-FIBER commercially available from Schuller Co., Ltd. (U.S.A.).

As the micro-glass fibers comprising silica glass, especially preferred are those which comprise silica glass containing at least 99% by weight of silicon dioxide (in terms of $SiO_2$). Such micro-glass fibers are commercially available, for example, in the name of Q-FIBER from Schuller Co., Ltd. (U.S.A.).

Average fiber diameter of the micro-glass fibers is preferably 3 µm or less. Nonwoven fabrics of high uniformity free from holes of several tens of µm to several hundreds of µm in diameter called pinholes can be produced by using the micro-glass fibers of the smaller average fiber diameter.

In case glass fibers having a large average fiber diameter are used in place of the micro-glass fibers, a porous base non-uniform in thickness and having many pinholes is obtained, and if this is used as a separator for non-aqueous electrolyte batteries, the electrical resistance in width direction of the separator also becomes non-uniform to cause short-circuit between electrodes due to the pinholes.

Content of the inorganic fibers in the porous base in the present invention is not limited, but is preferably 95% by weight or less, especially preferably 50% by weight or less. If it is more than 50% by weight, especially, more than 95% by weight, folding strength or interlaminar strength of the porous base is low to cause a problem in rollability with electrodes.

When the porous base in the present invention contains these inorganic fibers, dimensional stability at high temperatures increases and, hence, there is obtained a separator for non-aqueous electrolyte batteries which is excellent in heat resistance.

The heat resistant organic fibers used in the present invention mean those fibers which do not melt and decompose even at 250° C. and are not deteriorated so much even after stored for longer than 1 month in a high temperature atmosphere of 200° C.

Specifically, mention may be made of polyarylate fibers, polyphenylene sulfide fibers, polyether ketone fibers, polyimide fibers, polyether sulfone fibers, polyamide fibers, aramid fibers, polyamideimide fibers, polyether imide fibers and the like.

When the porous base used in the present invention contains heat resistant organic fibers having a melting point or a heat decomposition temperature of 250° C. or higher, dimensional stability at high temperature increases as compared with when it does not contain such organic fibers, and a separator for non-aqueous electrolyte batteries excellent in heat resistance is obtained.

As the organic fibers at least a part of which are fibrillated to a fiber diameter of 1 µm or less, there is no limitation as far as they can be fibrillated, but preferred are vegetable fibers, vegetable fiber pulp, bacteria cellulose produced by micro-organisms, rayon, polyolefin fibers, polyamide fibers, aramid fibers, and polyarylate fibers.

As the vegetable fibers and vegetable fiber pulp, mention may be made of wood pulp and non-wood fibers or non-wood pulp such as straw, bagasse, paper mulberry, mitsumata (*Edgeworthia papyrifera*), Manila hemp, esparto, cotton linter, ganpi (*Wikstroemia sikokiana* Fr. Et Sav.), jute, bamboo, ditch reed, papyrus, kenaf and ramie.

The bacteria cellulose produced by micro-organisms in the present invention is that which contains cellulose and heteropolysaccharides having cellulose as main chain and glucans such as β-1,3 and β-1,2. Constitutive components other than cellulose in the case of heteropolysaccharides are hexoses, pentoses and organic acids such as mannose, fructose, galactose, xylose, arabinose, rhamnose and glucuronic acid. These polysaccharides comprise a single substance in some case, and two or more polysaccharides bonded through hydrogen bond in some case. Either of them may be utilized.

Any bacteria celluloses produced by micro-organisms mentioned above may be used in the present invention.

The micro-organisms which produce the bacteria cellulose are not limited, and there may be used *Acetobacter aceti* subsp. *xylinium* ATCC 10821, *A. pasteurian, A. rancens, Sarcina ventriculi, Bacterium xyloides,* Pseudomonas bacteria, Agrobacterium bacteria, and the like that produce the bacteria cellulose.

Production and accumulation of bacteria cellulose by cultivation of these micro-organisms can be carried out in accordance with the general methods for culture of bacteria. That is, micro-organisms are inoculated in usual enriched media containing a carbon source, a nitrogen source, an inorganic salt and, if necessary, organic minor nutrients such as amino acid and vitamins, and then subjected to stationary culture or gentle spinner culture.

Then, the thus produced and accumulated bacteria cellulose is macerated to prepare an aqueous slurry. The maceration can be easily performed by a rotary macerator or mixer. The resulting bacteria cellulose macerated product is markedly higher in bonding ability between fibers than other cellulose fibers. Therefore, addition of the bacteria cellulose in only a small amount to other organic or inorganic fibers can give a porous base of high strength.

When the porous base used in the present invention contains the bacteria cellulose produced by micro-organisms, there is obtained a separator for non-aqueous electrolyte batteries which is high in mechanical strength and gives excellent battery fabricability at the time of fabrication of batteries.

As for the organic fibers at least a part of which are fibrillated to a fiber diameter of 1 µm or less used in the present invention, commercially available fibrillated fibers which are already fibrillated may only be macerated by a pulper or the like, and, furthermore, unfibrillated fibers may be previously fibrillated by a high-pressure homogenizing apparatus. In this case, also at least a part of the fibers may only be fibrillated to a fiber diameter of 1 µm or less.

In the case of carrying out the fibrillation using a high-pressure homogenizing apparatus, it can be performed, for example, in the following manner.

Organic fibers cut to a fiber length of 5 mm or less, preferably 3 mm or less are dispersed in water to prepare a suspension. Concentration of the suspension is 25% by weight at maximum, preferably 1–10% by weight, more preferably 1–2% by weight. This suspension is introduced into a high-pressure homogenizing apparatus used for preparation of emulsion or dispersion and repeatedly passed through the homogenizing apparatus under application of a pressure of at least 100 kg/cm$^2$, preferably 200–500 kg/cm$^2$, more preferably 400–500 kg/cm$^2$, during which a shearing force generated by rapid collision against the wall of apparatus and rapid speed reduction is applied to the organic fibers, and the effect is applied mainly as a force to cause tearing and loosening in the direction parallel to the fiber axis, resulting in gradual fibrillation.

Content of the organic fibers at least a part of which are fibrillated to a fiber diameter of 1 µm or less in the porous base used in the present invention has no limitation in the case of the fibers being natural fibers or bacteria cellulose produced by micro-organisms, but is preferably less than 50% by weight in the case of the fibers comprising synthetic polymers.

When the organic fibers at least a part of which are fibrillated to a fiber diameter of 1 µm or less in the present invention are natural fibers or bacteria cellulose produced by micro-organisms, a porous base excellent in strength can be obtained even when the organic fibers comprise 100% by weight of natural fibers or bacteria cellulose because self-binding force of these fibers due to hydrogen bond is strong.

On the other hand, when the organic fibers at least a part of which are fibrillated to a fiber diameter of 1 µm or less in the present invention comprise synthetic polymers, binding force of the fibers per se is weak, and if the porous base is produced using 50% by weight or more, especially 100% by weight of these fibers, the fibers fall off from the porous base or the porous base is very low in tear strength or penetration strength and has a problem in rollability with electrodes.

When at least a part of the organic fibers contained in the porous base used in the present invention are fibrillated to a fiber diameter of 1 µm or less, no pinholes are produced and mechanical strength is improved, and, therefore, a separator for non-aqueous electrolyte batteries which gives excellent battery fabricability such as rollability with electrodes at fabrication of batteries can be produced.

The polyvinyl alcohol in the present invention includes powdery or fibrous polyvinyl alcohol, either of which can be used. The powdery polyvinyl alcohol is made into an aqueous solution, which is allowed to contact with a porous base by impregnation, coating, spraying or the like and dried, whereby a film can be formed on the surface of the porous base.

The fibrous polyvinyl alcohol is mixed with other fibers and the mixture is made into an aqueous slurry. This is made into a sheet by wet paper making process or the like, and then the sheet is dried to form a film. For example, vinylon fibers manufactured by Kuraray Co., Ltd. can be exemplified.

Content of the polyvinyl alcohol in the porous base in the present invention is preferably 50% by weight or less, especially preferably 30% by weight or less.

If the content of the polyvinyl alcohol is more than 30% by weight, particularly more than 50% by weight, area of the film formed on the surface of the porous base becomes too large, and pores necessary for ion permeation are apt to be unevenly distributed, and, in some case, the porous base becomes filmy and the pores are ruptured.

The polyvinyl alcohol acts as a binder and strongly binds with organic fibers or inorganic fibers constituting the porous base. Thus, not only a separator for non-aqueous electrolyte batteries which is excellent in mechanical strengths such as tensile strength, tear strength and penetration strength can be obtained, but also a film is formed by heat on the surface of the separator and the pore diameter can be made small, and as a result, a thinner separator for non-aqueous electrolyte batteries can be obtained.

The heat-fusible fibers in the present invention include heat-meltable type of the fibers per se being partially or wholly molten by heat to produce binding force between fibers, a type of the fibers per se being partially or wholly dissolved in water or hot water and producing bonding force between fibers in the drying stage, and other types. These are used each alone or in admixture of two or more depending on the purpose.

As specific examples of these fibers, mention may be made of polyvinyl alcohol fibers, polyester fibers, polypropylene fibers, polyethylene fibers, composite fibers comprising polyethylene and polypropylene, composite fibers comprising polypropylene and ethylene-vinyl alcohol copolymer, and the like.

As the organometallic compounds used in the present invention, mention may be made of organosilicon compounds, organotitanium compounds, organoaluminum compounds, organozirconium compounds, organozirco-aluminate compounds, organotin compounds, organocalcium compounds, organonickel compounds, and the like. Among them, organosilicon compounds, organotitanium compounds, organoaluminum compounds, organozirconium compounds, and organozirco-aluminate compounds are preferred because these compounds are excellent in the effect of blocking polar groups which adversely affect battery characteristics.

Among them, especially preferred are organosilicon compounds because they can be easily handled in aqueous system, are excellent in film-forming ability when dried or cured by heating and great in the effect of blocking polar groups.

As the organosilicon compounds used in the present invention, preferred are organosilanes or organopolysiloxanes having at least one hydrolyzable group or functional group selected from chlorine group, fluorine group, acetoxy group, alkoxy group, vinyl group, amino group, epoxy group, mercapto group and methacryl group.

Examples of these organosilanes are organohalosilanes such as trimethylchlorosilane, methyltrichlorosilane, ethyltrichlorosilane, propyltrichlorosilane, hexyltrichlorosilane, dodecyltrichlorosilane, dimethyldichlorosilane, methyldichlorosilane, dimethylchlorosilane, dimethylvinylchlorosilane, methylvinyldichlorosilane, methylchlorodisilane, octadecyltrichlorosilane, trimethylchlorosilane, t-butylmethylchlorosilane, dichloroethylphenylsilane, triphenylchlorosilane, methyldiphenylchlorosilane, diphenyldichlorosilane, methylphenyldichlorosilane, phenyltrichlorosilane, chloromethyldimethylchlorosilane, chlorodifluoromethylsilane, dichlorodifluoromethylsilane, and dichlorodifluoropropylsilane; organoacetoxysilanes such as acetoxytrimethylsilane, diacetoxydimethylsilane, acetoxytripropylsilane, ethyltriacetoxysilane and methyltriacetoxysilane; organoalkoxysilanes such as methoxytrimethylsilane, dimethyldimethoxysilane, trimethylphenoxysilane, methyltrimethoxysilane, methyltriethoxysilane, ethyltrimethoxysilane, ethyltriethoxysilane, vinyltrimethoxysilane, phenyltrimethoxysilane, phenyltriethoxysilane, diphenyldimethoxysilane, diphenyldiethoxysilane, methylvinyldimethoxysilane, methylvinyldiethoxysilane, dimethylvinylmethoxysilane, dimethylvinylethoxysilane, tetramethoxysilane, tetraethoxysilane, tetrabutoxysilane, butyltriethoxysilane, pentyltriethoxysilane, hexyltriethoxysilane, heptyltriethoxysilane, octyltriethoxysilane, nonyltriethoxysilane, decyltriethoxysilane, undecyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane, octadecyltriethoxysilane, butyltrimethoxysilane, pentyltrimethoxysilane, hexyltrimethoxysilane, nonyltrimethoxysilane, decyltrimethoxysilane, undecyltrimethoxysilane, dodecyltrimethoxysilane, tridecyltrimethoxysilane, tetradecyltrimethoxysilane, pentadecyltrimethoxysilane, hexadecyltrimethoxysilane, heptadecyltrimethoxysilane and octadecyltrimethoxysilane; organosilazanes such as hexamethyldisilazane, 1,3-diphenyltetramethyldisilazane, octamethylcyclotetrasilazane, 1,1,3,3-tetramethyldisilazane and hexamethylcyclotrisilazane; isocyanate silanes such as trimethylsilyl isocyanate, dimethylsilyl isocyanate, methylsilyl triisocyanate, vinylsilyl triisocyanate, phenylsilyl triisocyanate, tetraisocyanate silane and ethoxysilane triisocyanate; silane coupling agents such as vinyltriethoxysilane, vinyltriacetoxysilane, vinyltris(β-methoxyethoxy)silane, β-(3,4-epoxycyclohexyl)ethyltrimethoxysilane, 3-mercaptopropyltrimethoxysilane, N-(β-aminomethyl)-γ-aminopropylmethyldiethoxysilane, N-(β-aminoethyl)-γ-aminopropyltrimethoxysilane, γ-methacryloxypropyltrimethoxysilane, γ-aminopropyltrimethoxysilane, γ-aminopropyltriethoxysilane, γ-chloropropyltrimethoxysilane, γ-glycidoxypropyltrimethoxysilane, γ-phenylaminopropyltrimethoxysilane and N-phenyl-γ-aminopropyltrimethoxysilane. The organosilanes are not limited to those exemplified above.

Examples of the organopolysiloxanes are methylpolysiloxane, dimethylpolysiloxane, methylpolycyclosiloxane, methylphenylpolysiloxane, methylhydrogenpolysiloxane, methylstyrene-modified silicones, long chain alkyl-modified silicones, polyether-modified silicones, amino-modified silicones, carbinol-modified silicones, epoxy-modified silicones, carboxyl-modified silicones, mercapto-modified silicones and methacryl-modified silicones. The organopolysiloxanes are not limited to those exemplified above.

The organosilicon compounds in the present invention are dissolved in solvents such as water, ethanol, methanol, chloroform or the like and hydrolyzed or condensed, and the resulting products are used.

The organosilicon compounds can react with polar groups such as hydroxyl group and silanol group by subjecting them to hydrolysis. Moreover, condensation between organosilicon compounds also proceeds to become an oligomer, and, hence, a film is formed and can be allowed to adhere.

In the present invention, alkalis or acids may be used as catalysts for the acceleration of hydrolysis or condensation of the organosilicon compounds.

As the organotitanium compounds used in the present invention, mention may be made of titanium alkoxides such as tetramethoxytitanium, diisopropoxybis (ethylacetoacetate)titanium, tetraisopropoxytitanium, tetra-n-butoxytitanium, butyl titanate dimer, tetrakis(2-ethylhexyloxy)titanium, tetramethyl titanate and tetrastearyloxytitanium; titanium acylates such as polyhydroxytitanium stearate and polyisopropoxytitanium stearate; titanium chelates such as diisopropoxybis(acetylacetonato) titanium, titanium lactate, isopropoxy(2-ethyl-1,3-hexanediolato)titanium, di(2-ethylhexoxy)bis(2-ethyl-1,3-hexanediolato)titanium, di-n-butoxybis-(triethanolaminato) titanium and tetraacetylacetonatetitanium; and titanium polymers such as tri-n-butoxytitanium monostearate polymer, tetra-n-butoxytitanium polymer and titanium phosphate polymer. The organotitanium compounds are not limited to these examples.

The organotitanium compounds in the present invention are used as hydrolyzates. Specifically, they mean organotitanium compounds dissolved in water or organic solvents. The organic solvents include ethanol, isopropanol, hexane, toluene, benzene, and the like.

For example, hydrolysis of titanium alkoxides results in precipitation of titanium oxide. In titanium acylates, unhydrolyzed acyl groups remain and form a long arrangement to cover the surface. Lower acylates are condensed to become polymers. Titanium chelates are more difficult to hydrolyze than titanium alkoxides, but show the similar reaction to titanium alkoxides.

Therefore, when a hydrolyzate of these organotitanium compounds is applied to a separator for non-aqueous electrolyte batteries, there is formed a film of titanium oxide or a film of the organotitanium compound having organic group.

As the organoaluminum compounds used in the present invention, mention may be made of aluminum isopropylate, aluminium tri-secondary-butoxide, aluminum ethylate, aluminum ethylacetoacetatediisopropylate, aluminum tris (ethylacetoacetate), aluminum tris(acetylacetonate), aluminum bisethylacetoacetatemonoacetylacetonate, acetoalkoxyaluminum diisopropylate, and the like. The organoaluminum compounds are not limited to these examples.

As the organozirconium compounds used in the present invention, mention may be made of zirconium n-propoxide, zirconium n-butoxide, zirconyl acetate, zirconium acetylacetonate, zirconium butoxyacetylacetonate, zirconium bisacetylacetonate, zirconium ethylacetoacetate, zirconium acetylacetonatobisethylacetoacetate, and the like. The organozirconium compounds are not limited to these examples.

The organozirco-aluminate compounds include zircoaluminate coupling agents.

Since the polar groups which adversely affect the battery characteristics can be blocked by applying these organometallic compounds, not only high energy density and excellent cycle life can be obtained, but also since the organometallic compounds are applied in the form of a film, heat resistance of the separator for non-aqueous electrolyte batteries is improved.

For example, when a separator for non-aqueous electrolyte batteries to which an organosilicon compound is uniformly applied is left to stand at a high temperature of 500° C. for a long period of time, only the organic matter bonding to silicon is oxidized and deteriorated and inorganic silica remains. Therefore, even when the separator for non-aqueous electrolyte batteries is kept in the state of such high temperature, the silica functions to maintain the shape of the separator, and especially the shrink in Z direction is inhibited by the silica remaining in the separator for non-aqueous electrolyte batteries. Thus, a separator for non-aqueous electrolyte batteries which is excellent in heat resistance and can prevent internal short-circuit of electrodes can be obtained. Furthermore, even when the organosilicon compound is not uniformly applied to the whole of the separator for non-aqueous electrolyte batteries, if the organosilicon compound is partially applied to the separator, for example, in the case the separator containing a material to which the organosilicon compound is applied, heat resistance of the separator is improved than when no organometallic compound is applied. The same effect as in the case of the organometallic compounds can be obtained by the organotitanium compounds, organoaluminum compounds and organozirconium compounds.

These organometallic compounds may be used each alone or in admixture of two or more. Moreover, after one or a mixture of two or more of them are applied to a porous base, another organometallic compound may be further applied thereto.

The separator for non-aqueous electrolyte batteries in the present invention is produced in the following manner.

That is, a porous base comprising at least one material selected from a porous film, a woven fabric and nonwoven fabric containing organic fibers and a paper is allowed to contact with a solution of the organometallic compound by impregnation, coating or spraying, followed by drying and curing with heating to apply the organometallic compound to the porous base.

When the porous base in the present invention is a composite, at least one porous base (A) selected from a porous film, a woven fabric and nonwoven fabric containing organic fibers and a paper or (A) and a porous base (B) containing no organic fibers are allowed to contact with a solution of the organometallic compound by impregnation, coating or spraying, followed by drying and curing with heating to previously apply the organometallic compound to the composite, and then a composite (C) comprising the combination of (A) or the combination of (A) and (B) is formed.

Another method is that after the composite (C) is formed which comprises the combination of at least one porous base (A) selected from a porous film, a woven fabric and nonwoven fabric containing organic fibers and a paper or comprises the combination of (A) and a porous base (B) containing no organic fibers, the composite (C) is allowed to contact with a solution of the organometallic compound by impregnation, coating or spraying, followed by drying and curing with heating to apply the organometallic compound to the composite (C).

Methods for producing the composite (C) in the present invention include a method which comprises combining a porous film, a woven fabric, a nonwoven fabric and a paper depending on the purpose, laminating them without bonding the layers and rolling the laminate together with electrodes at the time of fabrication of batteries and the said method where said laminate is formed with bonding the layers partially or at the whole surface to make a multi-layer body.

As the method for bonding the porous film, the woven or nonwoven fabric containing organic fibers and the paper in combination, effective are a method of hot pressing them using a hot calender, a hot soft calender, a hot embossing calender or the like, and a method of hot pressing them using a hot melt adhesive, split fabric, sizing fabric, polyethylene fine particles, and the like.

Similarly, for bonding at least one material selected from the porous film, the woven or nonwoven fabric containing organic fibers and the paper and the porous base containing no organic fibers in combination, effective are a method of hot pressing them using a hot calender, a hot soft calender, a hot embossing calender or the like, and a method of hot pressing them using a hot melt adhesive, split fabric, sizing fabric, polyethylene fine particles.

The temperature at which the porous base is produced by hot pressing in the present invention varies depending on the kinds of resins or organic fibers contained in the porous base and the hot pressing treatment is carried out at a temperature higher than Tg and lower than the melting point of the resin or organic fibers. The hot pressing treatment using hot calender or hot soft calender is preferred because the layers are bonded through the whole surface thereof and hence no interlaminar separation occurs at rolling together with electrodes. In the case of the hot pressing treatment using a hot embossing calender, the layers are partially bonded at the embossed pattern. Therefore, the composite can be formed without causing much decrease of gas permeability of the porous base, and if a sufficient bonding area is obtained, a strength causing no interlaminar separation at the rolling together with electrodes can be obtained. This is preferred.

Furthermore, when the porous base is produced by hot pressing treatment using a hot melt adhesive in the form of a sheet or a split fabric or a sizing fabric comprising polyolefin resin, polyester resin or polyamide resin or polyethylene fine particles, thereby to partially bond the layers, the composite can be obtained without causing much decrease of gas permeability of the porous base. Thus, this is preferred.

Other than these methods, as a method of bonding nonwoven fabrics per se, papers per se, and nonwoven fabric and paper, effective is a method of making them to a multi-layer by wet paper making process with each other, followed by drying or curing with heating to bond them or a method of water jet entangling by jetting a high-pressure columnar water.

When the separator for non-aqueous electrolyte batteries according to the present invention comprises a porous base of nonwoven fabric or a paper to which the organometallic compound is applied, the organometallic compound may be applied to the porous base by allowing a commercially available nonwoven fabric or paper or a ready-made nonwoven fabric or paper to contact with a solution of the organometallic compound by impregnation, coating or spraying, followed by drying or curing by heating. However, the polar groups which adversely affect the battery characteristics can be efficiently blocked by producing the separator in the following manner.

That is, a wet sheet obtained by wet paper making process or this sheet after dried is allowed to contact with a solution of the organometallic compound by impregnation, coating or spraying, followed by drying or curing by heating to apply the organometallic compound to the sheet.

By employing the wet paper making process, there is obtained a separator for non-aqueous electrolyte batteries which is superior to the conventional separators in tear strength and penetration strength.

The paper making machines used for the wet paper making include Fourdrinier paper machines, cylinder paper machines, inclined paper machines, combination paper machines comprising a combination of two or more, and the like.

According to the present invention, a fiber slurry containing the organometallic compound is beaten or macerated, and then the fiber slurry alone or a mixture of the fiber slurry with other fiber slurry is subjected to wet paper making process, followed by drying or curing with heating to apply the organometallic compound to the sheet, whereby the organometallic compound is also uniformly applied to binding points of the fibers, thereby increasing the effect of blocking the polar groups which adversely affect the battery characteristics.

Furthermore, according to the present invention, a fiber slurry containing the organometallic compound is beaten or macerated, then the fiber slurry alone or a mixture of the fiber slurry with other fiber slurry is subjected to wet paper making process, and then the resulting wet sheet or this sheet after dried is allowed to contact with a solution of the organometallic compound by impregnation, coating or spraying, followed by drying or curing with heating to apply the organometallic compound to the sheet. As a result, the effect of blocking the polar groups which adversely affect the battery characteristics is further increased and a separator for non-aqueous electrolyte batteries which is high in energy density and excellent in cycle life can be obtained.

Especially, when organic fibers at least a part of which are fibrillated to a fiber diameter of 1 $\mu$m or less and which contain the polar groups adversely affecting the battery characteristics are contained as a material constituting the separator for non-aqueous electrolyte batteries, a fiber slurry containing the fibers is mixed with the organometallic compound and the mixture is beaten or macerated thereby to apply the organometallic compound uniformly to the whole fibers. Thus, the effect to block the polar groups which adversely affect the battery characteristics is great.

As far as the effect to block the polar groups is not greatly lowered, for the purpose of increasing strength of the porous base, the fiber slurry in the present invention may be mixed with various adhesives, for example, thermoplastic resins such as of vinyl acetate type, vinyl chloride type, polyvinyl alcohol type, polyvinyl acetal type, acryl type, polyamide type, and ethylene-vinyl acetate copolymer; thermosetting resins such as of urea type, melamine type, phenolic type, epoxy type, polyurethane type, polyester type, polyaromatic type, and resorcinol type; and elastomers such as of chloroprene type, nitrile rubber type, butyl rubber type, polypropylene type and silicone rubber type.

In stead of mixing with the fiber slurry, the adhesives may be applied by allowing the wet sheet obtained by wet paper making process or this sheet after dried to contact with the adhesives by impregnation, coating or spraying, followed by drying or curing with heating.

The methods for beating or macerating the fiber slurry containing the organometallic compound in the present invention include a method of beating by a beating machine such as beater or refiner and a method of macerating by pulper or the like.

Concentration of the organometallic compound in the solution is usually 0.1–5%. If the concentration is lower than 0.1%, application amount of the organometallic compound is insufficient and polar groups which adversely affect the battery characteristics can be blocked with difficulty, and if it is higher than 5%, the effect of blocking the polar groups no longer changes.

Impregnation of the solution of the organometallic compound is carried out using an impregnating machine, and there are prewetting method, floating method and doctor bar method.

Methods for coating the solution of the organometallic compound in the present invention include those which use coaters such as size press, air doctor coater, blade coater, transfer roll coater, rod coater, reverse roll coater, gravure coater, die coater, and notch bar coater.

Methods for spraying the solution of the organometallic compound in the present invention include those which use spraying apparatuses such as spray.

Application amount of the organometallic compound to the porous base has no particular limitation, but is preferably 0.05% by weight or more, more preferably 0.1% by weight or more based on the weight of the material having the polar group which reacts with the organometallic compound. If the application amount is less than 0.05% by weight, the application amount of the organometallic compound is insufficient and the polar groups which adversely affect the battery characteristics cannot be completely blocked, and as a result the energy density and cycle life tend to be deteriorated. On the other hand, if it is 0.05% by weight or more, the polar groups which adversely affect the battery characteristics can be completely blocked, and as a result the energy density and cycle life of non-aqueous electrolyte batteries are improved. When the application amount is 0.1% by weight or more, the effect does not change with increase of the application amount, but heat resistance of the separator for non-aqueous electrolyte batteries is improved with increase of the application amount and hence there is no special upper limit. However, application of the organometallic compound in a large amount sometimes causes clogging of the separator, resulting in reduction of ion permeability and causes problems in energy density and cycle life. Therefore, the upper limit is preferably 20% by weight, more preferably 10% by weight.

The solution of the organometallic compound is not only applied to the surface of the porous base, but also penetrates into the porous base and can block the polar groups such as hydroxyl group and silanol group which adversely affect the battery characteristics. Therefore, there is obtained a separator for non-aqueous electrolyte batteries which provides high energy density and excellent cycle life.

When the porous base in the present invention contains a nonwoven fabric or a paper, since there are complicated interlockings of the fibers also in the Z direction, the organometallic compound can be widely applied up to the inside of the porous base, resulting in a great effect to inhibit shrinking in the Z direction at high temperatures. Thus, there can be obtained a separator for non-aqueous electrolyte batteries which is excellent especially in heat resistance.

When the maximum pore diameter of the nonwoven fabric or paper used in the present invention is 20 μm or less as measured by bubble point method specified in ASTM F-316-80, the separator is excellent in electrolyte retention, and since charging and discharging can be stably repeated, an excellent cycle life and battery shelf stability can be obtained.

When the porous base in the present invention contain especially the nonwoven fabric, the porous base swells a little after immersed in the electrolyte and is excellent in dimensional stability, and hence area of the electrodes to be incorporated in the battery can be gained and non-aqueous electrolyte batteries of high capacity can be obtained.

Basis weight of the separator for non-aqueous electrolyte batteries of the present invention has no special limitation, but is preferably 5–100 g/m$^2$, more preferably 10–50 g/m$^2$.

Thickness of the separator for non-aqueous electrolyte batteries according to the present invention depends on the thickness of the porous base used and has no special limitation, but is preferably thinner from the point of miniaturization of the batteries. Specifically, the thickness is preferably 10–100 μm, more preferably 20–60 μm for providing such a strength as being not broken at the fabrication of batteries, producing no pinholes and giving a high uniformity. If the thickness is less than 10 μm, percentage of rejects due to short-circuit at the time of fabrication of batteries tends to increase. If it is more than 100 μm, electrical resistance due to the thickness increases, and battery characteristics tends to deteriorate or the energy density tends to considerably decrease.

When the thickness of the separator for non-aqueous electrolyte batteries is greater than desired or void content of the separator is high, it is necessary to reduce the thickness or decrease the void content by secondary processing. This secondary processing include pressing or hot pressing by calenders such as super calender, machine calender, soft calender, hot calender and hot soft calender.

When the separator is subjected to pressing, reversion of the thickness sometimes occurs with time. On the other hand when the separator is subjected to hot pressing, the reversion of the thickness hardly occurs though it depends on the processing temperature, and the separator can easily be adjusted to the desired thickness or void content.

The processing temperature for hot pressing the separator using a hot calender or hot soft calender varies depending on the kind of the resin or organic fibers contained in the porous base, and the separator is processed at a temperature higher than Tg and lower than the melting point of the resin or organic fibers. Especially when heat-fusible fibers are contained, it is necessary to raise the processing temperature to a temperature at which the adhesive force of the heat-fusible fibers is developed. In view of the construction of the organic fibers and the processing conditions, the processing temperature is preferably 50–200° C. If the pressing is carried out at lower than 50° C., there are sometimes caused such troubles that no sufficient adhesive force is developed, reversion of the thickness occurs with lapse of time, the thickness cannot be reduced to the desired thickness, and cracks are produced. If the pressing is carried out at higher than 200° C., the resin or organic fibers per se are sometimes deteriorated with heat to cause decrease of strength or distortion of the separator. Even if the deterioration does not occur, the density of the separator for non-aqueous electrolyte batteries increase too much and sufficient void content cannot be obtained to damage the battery performance.

The timing of subjecting the porous base to the pressing or hot pressing may be either before or after the application of the organometallic compound to the porous base.

In case the porous base used in the present invention is a composite, the timing of subjecting it to the pressing or hot pressing may be either before or after the formation of the composite, but in case porous bases differing greatly in heat resistance or heat shrinkability are made to a composite, the processing is preferably carried out before the formation of the composite because creases or distortion sometimes result if it is carried out after the formation of the composite.

Especially, when the porous base in the present invention is a composite containing a nonwoven fabric, it is preferred to make the composite after the nonwoven fabric is subjected to pressing or hot pressing to adjust the thickness. This is because the surface smoothness of the nonwoven fabric is improved by the pressing or hot pressing to increase the adhesion to the porous base, providing a uniform composite. Especially the hot pressing has a great effect since the surface smoothness and strength of the nonwoven fabric are markedly improved.

For the same reasons, when the porous base in the present invention is a composite containing a paper, it is preferred to make the composite after the paper is subjected to pressing to adjust the thickness and increase the surface smoothness.

When the porous base used in the present invention is a composite of a porous base having the polar group adversely affecting the battery characteristics and a porous base having no such group, the composite may be made after the organometallic compound is applied to only the former porous base.

The timing of subjecting to pressing or hot pressing a porous base comprising a nonwoven fabric or paper produced by allowing a dried sheet obtained by subjecting to wet paper making process a fiber slurry containing or not containing the organometallic compound to contact with a solution of the organometallic compound by impregnation, coating or spraying, followed by drying or curing by heating to apply the organometallic compound to the sheet may be either before or after the application of the organometallic compound.

By the pressing or hot pressing, the separator for non-aqueous electrolyte batteries according to the present invention is not only adjusted to the desired thickness or void, but also is improved in the surface smoothness, and therefore is improved in adhesion to electrodes and gap or space are hardly produced between the electrode and the separator at the time of rolling together with electrodes.

Moreover, pore diameter of the separator can be reduced by the pressing or hot pressing.

Particularly, by the hot pressing, the heat-fusible fibers or the organic fibers or resin of low melting point contained in the separator produce a film, which strongly binds with other fibers or resin to markedly improve tear strength or penetration strength of the separator. Thus, a separator for non-aqueous electrolyte batteries which is very good in rollability with electrodes is obtained, and the pore diameter can further be reduced and the maximum pore diameter can be reduced to 20 μm or less, further 10 μm or less as measured by the bubble point method specified in ASTM F-316-80.

Furthermore, by carrying out the hot pressing, the heat-fusible fibers or the organic fibers or resin of low melting point contained in the separator produce a film, which causes strong binding with other fibers or resin, and therefore the separator swells a little after immersed in the electrolyte and is excellent in dimensional stability, and area of electrode to be incorporated into the battery can be gained, and as a result, non-aqueous electrolyte batteries of high capacity can be obtained.

EXAMPLE

The present invention will be explained in detail by the following examples. The present invention is not limited to these examples. The "%" means "% by weight".

Separators for non-aqueous electrolyte batteries as shown in the following Tables 1–4 were made. In these Tables, "PP" means polypropylene, "PVA" means polyvinyl alcohol, "PP/PE" means core-sheath composite fibers comprising polypropylene resin and polyethylene resin, "PI" means polyimide, and "BC" means bacteria cellulose.

TABLE 1

| Example | Organometallic compound | Porous base |
|---------|------------------------|-------------|
| 1 | Tetraisopropoxytitanium | Porous film |
| 2 | Chlorodimethylsilane | Woven fabric |
| 3–4 | γ-Glycidoxypropyl-trimethoxysilane | Nonwoven fabric |
| 5–7 | γ-Aminopropyltrimethoxysilane | Paper |
| 8–12 | Methyltrimethoxysilane | Nonwoven fabric |
| 13–15 | Tetraisopropoxytitanium | Nonwoven fabric |
| 16 | Tetraisopropoxytitanium | Nonwoven fabric |
| 17 | Chlorodimethylsilane | Woven fabric + porous film |
| 18–26 | Methyltrimethoxysilane | Woven fabric + porous film |
| 27–29 | Chlorodimethylsilane | Nonwoven fabric + porous film |
| 30–32 | γ-Glycidoxypropyl-trimethoxysilane | Nonwoven fabric + porous film |
| 33 | Tetra-n-butoxytitanium | Nonwoven fabric + porous film |
| 34–36 | Methyltrimethoxysilane | Nonwoven fabric + porous film |
| 37–39 | γ-Aminopropyltrimethoxysilane | Paper + porous film |
| 40–42 | γ-Glycidoxypropyl-trimethoxysilane | Paper + nonwoven fabric |

TABLE 2

| Example | Organometallic compound | Porous base |
|---|---|---|
| 43–55 | γ-Aminopropyltrimethoxy-silane | Nonwoven fabric (PP + PVA) |
| 56–63 | γ-Glycidoxypropyl-trimethoxysilane | Paper (NBKP) |
| 64–65 | Tetraisopropoxytitanium | Nonwoven fabric (Micro-glass + PP/PE) |
| 66–73 | Methyltriethoxysilane | Nonwoven fabric (Micro-glass + PP + PP/PE) |
| 74–76 | Titanium lactate | Nonwoven fabric (Micro-glass + PI + PP/PE) |
| 77–79 | Tetra-n-butoxytitanium | Nonwoven fabric (Micro-glass + PP/PE + PVA) |
| 80–86 | Methyltriethoxysilane | Nonwoven fabric (NBKP + PP + polyarylate) |
| 87–89 | Titanium lactate | Nonwoven fabric (PP + PVA) |
| 90–96 | γ-Aminopropyltrimethoxy-silane | Nonwoven fabric (Micro-glass + BC + PP/PE + PVA) |
| 97–103 | γ-Glycidoxypropyl-trimethoxysilane | Nonwoven fabric (Micro-glass + PI + PP/PE + PVA) |

TABLE 3

| Example | Organometallic compound | Porous base |
|---|---|---|
| 104–110 | γ-Glycidoxypropyl-trimethoxysilane | Nonwoven fabric (Micro-glass + BC + polyarylate + PP/PE) |
| 111–115 | Methyltrimethoxysilane | Nonwoven fabric (Polyarylate + PP/PE + PVA) |
| 116–124 | Methyltrimethoxysilane | Nonwoven fabric (Micro-glass + polyarylate + PP/PE + PVA) |

TABLE 4

| Comparative Example | Organometallic compound | Porous base |
|---|---|---|
| 1 | No | Microporous film |
| 2 | No | PP porous film + PP dry process nonwoven fabric |
| 3 | No | Nonwoven fabric (Manila hemp + aramid + PP + PP/PE) |
| 4 | No | Nonwoven fabric (Polyacrylonitrile) |
| 5 | No | Nonwoven fabric (Polyethylene) |
| 6 | No | Glass fiber nonwoven fabric |
| 7 | Polysiloxane | PP porous film |
| 8 | Polysiloxane | PP porous film + PP dry process nonwoven fabric |
| 9 | Titanium oxide | Fluorocarbon resin porous film |
| 10 | Silica gel | PP porous film |
| 11 | Methyltrimethoxysilane | Glass fiber nonwoven fabric |
| 12 | Methyltrimethoxysilane | Glass fiber filter paper |
| 13 | No | Paper |
| 14 | No | Nonwoven fabric (Micro-glass + PP/PE) |
| 15 | No | Nonwoven fabric (PP + PVA) |

Example 1

A mixed solution comprising 1% of tetraisopropoxytitanium (ORGATIX TA-10 manufactured by Matsumoto Chemical Industry Co., Ltd.) and 99% of ethanol was prepared. A polypropylene porous film (basis weight: 12.8 g/m$^2$; thickness: 25 µm) having a maximum pore diameter of 6 µm as measured by the bubble point method specified in ASTM F-316-80 was impregnated with the tetraisopropoxytitanium solution prepared in this example and subjected to hot-air drying to make a porous film to which 0.3% of a hydrolyzate of the organotitanium compound was applied. This was used as a separator for non-aqueous electrolyte batteries.

Example 2

A chlorodimethylsilane solution was prepared by dissolving chlorodimethylsilane in chloroform so as to give a concentration of 1 mol/l. A rayon woven fabric having a basis weight of 30 g/m$^2$ and a thickness of 93 µm was impregnated with the chlorodimethylsilane solution prepared in this example, followed by curing with heating to make a rayon woven fabric to which 8.1% of the organosilicon compound was applied. This was used as a separator for non-aqueous electrolyte batteries.

Example 3

A nonwoven fabric comprising 30% of NBKP and 70% of polypropylene fibers and having a basis weight of 20 g/m$^2$ and a thickness of 72 µm was impregnated with a 1% solution of γ-glycidoxypropyltrimethoxysilane (A-187 manufactured by Nippon Unicar Co., Ltd.), followed by curing with heating to make a nonwoven fabric to which 6.9% of the organosilicon compound based on the weight of NBKP was applied. This was used as a separator for non-aqueous electrolyte batteries.

Example 4

The nonwoven fabric made in Example 3 was subjected to pressing by a supercalender to adjust the thickness to 50 µm, thereby making a nonwoven fabric having a maximum pore diameter of 11 µm as measured by the bubble point method specified in ASTM F-316-80. This was used as a separator for non-aqueous electrolyte batteries.

Example 5

A paper comprising 100% of NBKP and having a basis weight of 30 g/m$^2$ and a thickness of 60 µm was impregnated with a 1% solution of γ-aminopropyltrimethoxysilane (A-1110 manufactured by Nippon Unicar Co., Ltd.), followed by curing with heating to make a paper to which 7.4% of the organosilicon compound was applied. This was used as a separator for non-aqueous electrolyte batteries.

Example 6

A paper to which 4.9% of the organosilicon compound was applied was made in the same manner as in Example 5, except that the γ-aminopropyltrimethoxysilane solution prepared in Example 5 was coated. This was used as a separator for non-aqueous electrolyte batteries.

Example 7

A paper to which 2.1% of the organosilicon compound was applied was made in the same manner as in Example 5, except that the γ-aminopropyltrimethoxysilane solution prepared in Example 5 was sprayed. This was used as a separator for non-aqueous electrolyte batteries.

Example 8

Acetic acid was added to a mixed solution of methanol and water (1:1) so as to give an acetic acid concentration of 1%. Therein was dissolved methyltrimethoxysilane (A-163 manufactured by Nippon Unicar Co., Ltd.) so as to give a concentration of 0.5% to prepare a methyltrimethoxysilane solution. A nonwoven fabric having a basis weight of 25 g/m² and a thickness of 112 μm and comprising 40% of micro-glass fibers made of borosilicate glass and 60% of polypropylene fibers was impregnated with the methyltrimethoxysilane solution prepared in this example, followed by curing with heating to make a nonwoven fabric to which 1.1% of the organosilicon compound based on the weight of the micro-glass fibers was applied. This was used as a separator for non-aqueous electrolyte batteries.

Components of the micro-glass fibers used in this example are as follows.

<Components of Micro-glass Fibers>

| | |
|---|---|
| $SiO_2$ | 58.55% |
| $B_2O_3$ | 10.5% |
| $Na_2O$ | 10.1% |
| $Al_2O_3$ | 5.8% |
| BaO | 5.0% |
| ZnO | 4.0% |
| $K_2O$ | 3.2% |
| CaO | 1.9% |
| $F_2$ | 0.6% |
| MgO | 0.3% |
| $Fe_2O_3$ | 0.04% |
| $TiO_2$ | 0.01% |

Example 9

The nonwoven fabric used in Example 8 was subjected to pressing by a supercalender to adjust the thickness to 80 μm. Then, this nonwoven fabric was impregnated with the methyltrimethoxysilane solution prepared in Example 8, followed by curing with heating to make a nonwoven fabric to which 1.1% of the organosilicon compound based on the weight of the micro-glass fibers was applied. This was used as a separator for non-aqueous electrolyte batteries.

Example 10

The nonwoven fabric used in Example 8 was subjected to hot pressing at a processing temperature of 110° C. by a hot calender to adjust the thickness to 50 μm, thereby making a nonwoven fabric having a maximum pore diameter of 10 μm as measured by the bubble point method specified in ASTM F-316-80. Then, this nonwoven fabric was impregnated with the methyltrimethoxysilane solution prepared in Example 8, followed by curing with heating to make a nonwoven fabric to which 0.9% of the organosilicon compound based on the weight of the micro-glass fibers was applied. This was used as a separator for non-aqueous electrolyte batteries.

Example 11

A nonwoven fabric to which 0.2% of the organosilicon compound based on the weight of the micro-glass fibers was applied was made in the same manner as in Example 10, except that the nonwoven fabric was coated with the methyltrimethoxysilane solution prepared in Example 8 in stead of being impregnated. This was used as a separator for non-aqueous electrolyte batteries.

Example 12

A nonwoven fabric to which 0.05% of the organosilicon compound based on the weight of the micro-glass fibers was applied was made in the same manner as in Example 10, except that the nonwoven fabric was sprayed with the methyltrimethoxysilane solution prepared in Example 8 in stead of being impregnated. This was used as a separator for non-aqueous electrolyte batteries.

Example 13

The nonwoven fabric used in Example 8 was subjected to hot pressing at a processing temperature of 110° C. by a hot calender to adjust the thickness to 50 μm, thereby making a nonwoven fabric having a maximum pore diameter of 10 μm as measured by the bubble point method specified in ASTM F-316-80. Then, this nonwoven fabric was impregnated with the tetraisopropoxytitanium solution prepared in Example 1, followed by hot-air drying to make a nonwoven fabric to which 2.3% of a hydrolyzate of the organotitanium compound based on the weight of the micro-glass fibers was applied. This was used as a separator for non-aqueous electrolyte batteries.

Example 14

A nonwoven fabric to which 1.4% of the hydrolyzate of the organotitanium compound based on the weight of the micro-glass fibers was applied was made in the same manner as in Example 13, except that the nonwoven fabric was coated with the tetraisopropoxytitanium solution prepared in Example 1 in stead of being impregnated. This was used as a separator for non-aqueous electrolyte batteries.

Example 15

A nonwoven fabric to which 0.6% of the hydrolyzate of the organotitanium compound based on the weight of the micro-glass fibers was applied was made in the same manner as in Example 13, except that the nonwoven fabric was sprayed with the tetraisopropoxytitanium solution prepared in Example 1 in stead of being impregnated. This was used as a separator for non-aqueous electrolyte batteries.

Example 16

A nonwoven having a basis weight of 20 g/m² and a thickness of 85 μm and comprising 50% of polyarylate fibers, 40% of polypropylene fibers and 10% of polyvinyl alcohol fibers was impregnated with the tetraisopropoxytitanium solution prepared in Example 1, followed by hot-air drying to make a nonwoven fabric to which 0.5% of a hydrolyzate of the organotitanium compound based on the weight of the polyvinyl alcohol fibers was applied. This nonwoven fabric was subjected to hot pressing at a processing temperature of 110° C. by a hot calender to adjust the thickness to 40 μm, thereby obtaining a nonwoven fabric having a maximum pore diameter of 7 μm as measured by the bubble point method specified in ASTM F-316-80. This was used as a separator for non-aqueous electrolyte batteries.

Example 17

The rayon woven fabric made in Example 2 was interposed between polypropylene porous films (13.1 g/m², thickness 25 μm) having a maximum pore diameter of 0.5 μm as measured by the bubble point method specified in ASTM F-316-80. Furthermore, a sheet-like hot melt adhesive comprising polyolefin resin was interposed between the rayon woven fabric and the polypropylene porous film, followed by hot pressing at 90° C. to bond them to make a composite. This was used as a separator for non-aqueous electrolyte batteries.

Example 18

The nonwoven fabric made in Example 10 was superposed on the polypropylene porous film used in Example 17 and these were used, as they were, as a separator for non-aqueous electrolyte batteries.

Example 19

The nonwoven fabric used in Example 8 was subjected to hot pressing at a processing temperature of 110° C. by a hot calender to adjust the thickness to 50 µm to make a nonwoven fabric having a maximum pore diameter of 10 µm as measured by the bubble point method specified in ASTM F-316-80. The resulting nonwoven fabric was superposed on the polypropylene porous film used in Example 17, and a sheet-like hot melt adhesive comprising polyolefin resin was interposed therebetween, followed by hot pressing at 90° C. to bond them to make a composite. Then, this composite was impregnated with the methyltrimethoxysilane solution prepared in Example 8, followed by curing with heating to make a composite to which 1.2% of the organosilicon compound based on the weight of the micro-glass fibers was applied. This composite was used as a separator for non-aqueous electrolyte batteries.

Example 20

The nonwoven fabric made in Example 10 and the polypropylene porous film used in Example 17 were bonded to each other in the same manner as in Example 19 to make a composite. This composite was as a separator for non-aqueous electrolyte batteries.

Example 21

The nonwoven fabric used in Example 8 and the polypropylene porous film used in Example 17 were bonded to each other in the same manner as in Example 19 to make a composite. This composite was subjected to pressing by a supercalender to adjust the thickness to 80 µm. Then, this composite was impregnated with the methyltrimethoxysilane solution prepared in Example 8 to make a composite to which 1.0% of the organosilicon compound based on the weight of the micro-glass fibers was applied. This composite was used as a separator for non-aqueous electrolyte batteries.

Example 22

The nonwoven fabric used in Example 8 and the polypropylene porous film used in Example 17 were bonded to each other in the same manner as in Example 19 to make a composite. Then, this composite was impregnated with the methyltrimethoxysilane solution prepared in Example 8, followed by curing with heating to make a composite to which 1.1% of the organosilicon compound based on the weight of the micro-glass fibers was applied. This composite was subjected to pressing by a supercalender to adjust the thickness to 80 µm. This was used as a separator for no-aqueous electrolyte batteries.

Example 23

The nonwoven fabric made in Example 8 and the polypropylene porous film used in Example 17 were bonded to each other in the same manner as in Example 19 to make a composite. This composite was subjected to pressing by a supercalender to adjust the thickness to 80 µm. This composite was used as a separator for non-aqueous electrolyte batteries.

Example 24

The nonwoven fabric made in Example 8 was subjected to hot pressing at a processing temperature of 110° C. by a hot calender to adjust the thickness to 50 µm to make a nonwoven fabric having a maximum pore diameter of 10 µm as measured by the bubble point method specified in ASTM F-316-80. The resulting nonwoven fabric and the polypropylene porous film used in Example 17 were bonded to each other in the same manner as in Example 19 to make a composite. This was used as a separator for non-aqueous electrolyte batteries.

Example 25

A nonwoven fabric comprising 100% of the micro-glass fibers of the same composition as in Example 8 and having a basis weight of 30 g/m$^2$ and a thickness of 148 µm was impregnated with the methyltrimethoxysilane solution prepared in Example 8, followed by curing with heating to make a nonwoven fabric to which 1.0% of the organosilicon compound based on the weight of the micro-glass fibers was applied. This nonwoven fabric and the polypropylene porous film used in Example 17 were bonded to each other in the same manner as in Example 17 to make a composite. This was used as a separator for non-aqueous electrolyte batteries.

Example 26

The nonwoven fabric used in Example 25 and the polypropylene porous film used in Example 17 were bonded to each other in the same manner as in Example 17 to make a composite. This composite was impregnated with the methyltrimethoxysilane solution prepared in Example 8, followed by curing with heating to make a composite to which 0.5% of the organosilicon compound based on the weight of the micro-glass fibers was applied. This was used as a separator for non-aqueous electrolyte batteries.

Example 27

A nonwoven fabric having a basis weight of 20 g/m$^2$ and a thickness of 91 µm and comprising 30% of alumina short fibers, 30% of polyimide fibers and 40% of polypropylene fibers was subjected to hot pressing at a processing temperature of 110° C. by a hot calender to adjust the thickness to 40 µm to make a nonwoven fabric having a maximum pore diameter of 10 µm as measured by the bubble point method specified in ASTM F-316-80. This nonwoven fabric was impregnated with the chlorodimethylsilane solution prepared in Example 2, followed by curing with heating to make a nonwoven fabric to which 3.0% of the organosilicon compound based on the weight of the micro-glass fibers was applied. The polypropylene porous film used in Example 17 was superposed on the said nonwoven fabric, followed by subjecting to hot pressing at a processing temperature of 90° C. by a hot calender to bond them to make a composite. This was used as a separator for non-aqueous electrolyte batteries.

Components of the alumina fibers in this example were as follows.

<Components of the Alumina Fibers>

| | |
|---|---|
| $Al_2O_3$ | 85% |
| $SiO_2$ | 15% |

Example 28

A nonwoven fabric having a basis weight of 20 g/m$^2$ and a thickness of 82 µm and comprising 20% of the alumina short fibers having the same composition as in Example 27, 40% of polypropylene fibers and 40% of polyethylene fibers at least a part of which were fibrillated to a fiber diameter of 1 μm or less was subjected to hot pressing at a processing temperature of 110° C. by a hot calender to adjust the thickness to 45 μm to make a nonwoven fabric having a maximum pore diameter of 8 μm as measured by the bubble point method specified in ASTM F-316-80. This nonwoven fabric was coated with the chlorodimethylsilane solution prepared in Example 2, followed by curing with heating to make a nonwoven fabric to which 2.3% of the organosilicon compound based on the weight of the micro-glass fibers was applied. This nonwoven fabric and the polypropylene porous film used in Example 17 were bonded to each other in the same manner as in Example 27 to make a composite. This was used as a separator for non-aqueous electrolyte batteries.

Example 29

A nonwoven fabric having a basis weight of 20 g/m$^2$ and a thickness of 78 μm and comprising 30% of the alumina short fibers having the same composition as in Example 27, 60% of polypropylene fibers and 10% of polyvinyl alcohol fibers was subjected to hot pressing at a processing temperature of 100° C. by a hot calender to adjust the thickness to 40 μm to make a nonwoven fabric having a maximum pore diameter of 8 μm as measured by the bubble point method specified in ASTM F-316-80. This nonwoven fabric was sprayed with the chlorodimethylsilane solution prepared in Example 2, followed by curing with heating to make a nonwoven fabric to which was applied 1.1% of the organosilicon compound based on the total weight of the micro-glass fibers and the polyvinyl alcohol fibers. This nonwoven fabric and the polypropylene porous film used in Example 17 were bonded to each other in the same manner as in Example 27 to make a composite. This was used as a separator for non-aqueous electrolyte batteries.

Example 30

A nonwoven fabric having a basis weight of 15 g/m$^2$ and a thickness of 60 μm and comprising 30% of micro-glass fibers comprising 99.8% of silicon dioxide, 20% of polyimide fibers, 40% of polypropylene fibers and 10% of polyvinyl alcohol fibers was subjected to hot pressing at a processing temperature of 120° C. by a hot calender to adjust the thickness to 35 μm to make a nonwoven fabric having a maximum pore diameter of 8 μm as measured by the bubble point method specified in ASTM F-316-80. This nonwoven fabric and the polypropylene porous film used in Example 17 were bonded to each other in the same manner as in Example 27 to make a composite. This composite was impregnated with the γ-glycidoxypropyltrimethoxysilane solution prepared in Example 3, followed by curing with heating to make a composite to which was applied 2.7% of the organosilicon compound based on the total weight of the micro-glass fibers and the polyvinyl alcohol fibers. This was used as a separator for non-aqueous electrolyte batteries.

Example 31

A nonwoven fabric having a basis weight of 20 g/m$^2$ and a thickness of 83 μm and comprising 15% of the micro-glass fibers of the same composition as in Example 30, 50% of polyarylate fibers and 35% of polypropylene fibers at least a part of which were fibrillated to a fiber diameter of 1 μm or less was impregnated with the γ-glycidoxypropyltrimethoxysilane solution prepared in Example 3, followed by curing with heating to make a composite to which 2.4% of the organosilicon compound based on the micro-glass fibers was applied. The resulting nonwoven fabric and the polypropylene porous film used in Example 17 were bonded to each other in the same manner as in Example 27 to make a composite. The resulting composite was subjected to hot pressing at a processing temperature of 80° C. by a hot calender to adjust the thickness to 60 μm to make a nonwoven fabric having a maximum pore diameter of 9 μm as measured by the bubble point method specified in ASTM F-316-80. This was used as a separator for non-aqueous electrolyte batteries.

Example 32

A nonwoven fabric having a basis weight of 30 g/m$^2$ and a thickness of 132 am and comprising 15% of the micro-glass fibers of the same composition as in Example 30, 50% of polypropylene fibers, 30% of polyethylene fibers at least a part of which were fibrillated to a fiber diameter of 1 μm or less and 5% of polyvinyl alcohol fibers was impregnated with the γ-glycidoxypropyltrimethoxysilane solution prepared in Example 3, followed by curing with heating to make a nonwoven fabric to which was applied 2.2% of the organosilicon compound based on the total weight of the micro-glass fibers and the polyvinyl alcohol. The resulting nonwoven fabric was subjected to hot pressing at a processing temperature of 110° C. by a hot calender to adjust the thickness to 50 μm to make a nonwoven fabric having a maximum pore diameter of 6 μm as measured by the bubble point method specified in ASTM F-316-80. The resulting nonwoven fabric and the polypropylene porous film used in Example 17 were bonded to each other in the same manner as in Example 27 to make a composite. This was used as a separator for non-aqueous electrolyte batteries.

Example 33

A mixed solution comprising 1% of tetra-n-botoxytitanium (ORGATIX TA-25 manufactured by Matsumoto Seiyaku Kogyo Co., Ltd.) and 99% of ethanol was prepared. A nonwoven fabric having a basis weight of 25 g/m$^2$ and a thickness of 104 μm and comprising 30% of polyimide fibers, 40% of polypropylene fibers and 30% of NBKP at least a part of which was fibrillated to a fiber diameter of 1 μm or less and the polypropylene porous film used in Example 17 were bonded to each other in the same manner as in Example 27 to make a composite. This composite was impregnated with the tetra-n-butoxytitanium solution prepared in this example, followed by hot-air drying to make a composite to which 6.5% of a hydrolyzate of the organotitanium compound based on the weight of the NBKP was applied. The resulting composite was subjected to pressing by a supercalender to adjust the thickness to 65 μm. This was used as a separator for non-aqueous electrolyte batteries.

Example 34

Acetic acid was added to a mixed solution of methanol and water (1:1) so as to give an acetic acid concentration of 1%. Therein was dissolved methyltrimethoxysilane (A-163 manufactured by Nippon Unicar Co., Ltd.) so as to give a concentration of 1% to prepare a methyltrimethoxysilane solution. A nonwoven fabric having a basis weight of 20 g/m$^2$ and a thickness of 83 μm and comprising 20% of polyarylate fibers, 40% of polypropylene fibers, 30% of NBKP at least a part of which was fibrillated to a fiber diameter of 1 μm or less and 10% of polyvinyl alcohol fibers was interposed between the polypropylene porous films used in Example 17 and these were bonded to each other in the same manner as in Example 27 to make a composite. This composite was impregnated with the methyltrimethoxysilane solution prepared in this example, followed by curing with heating to make a composite to which was applied 5.2% of the organosilicon compound based on the total weight of the NBKP and the polyvinyl alcohol fibers. This was used as a separator for non-aqueous electrolyte batteries.

Example 35

A nonwoven fabric having a basis weight of 15 g/m$^2$ and a thickness of 60 µm and comprising 25% of the micro-glass fibers having the same composition as in Example 30, 35% of polypropylene fibers and 40% of polyarylate fibers at least a part of which were fibrillated to a fiber diameter of 1 µm or less was subjected to hot pressing at a processing temperature of 110° C. by a hot calender to adjust the thickness to 35 µm to make a nonwoven fabric having a maximum pore diameter of 4 µm as measured by the bubble point method specified in ASTM F-316-80. This nonwoven fabric and the polypropylene porous film used in Example 17 were bonded to each other in the same manner as in Example 27 to make a composite. This composite was impregnated with the methyltrimethoxysilane solution prepared in Example 8, followed by curing with heating to make a composite to which 3.5% of the organosilicon compound based on the weight of the micro-glass fibers was applied. This composite was used as a separator for non-aqueous electrolyte batteries.

Example 36

A nonwoven fabric having a basis weight of 15 g/m$^2$ and a thickness of 57 µm and comprising 25% of the micro-glass fibers having the same composition as in Example 30, 30% of polypropylene fibers, 40% of polyarylate fibers at least a part of which were fibrillated to a fiber diameter of 1 µm or less and 5% of polyvinyl alcohol fibers was subjected to hot pressing at a processing temperature of 110° C. by a hot calender to adjust the thickness to 30 µm to make a nonwoven fabric having a maximum pore diameter of 4 µm as measured by the bubble point method specified in ASTM F-316-80. This nonwoven fabric and the polypropylene porous film used in Example 17 were bonded to each other in the same manner as in Example 27 to make a composite. This composite was impregnated with the methyltrimethoxysilane solution used in Example 8, followed by curing with heating to make a composite to which was applied 3.3% of the organosilicon compound based on the total weight of the micro-glass fibers and the polyvinyl alcohol fibers. This composite was used as a separator for non-aqueous electrolyte batteries.

Example 37

A paper having a basis weight of 15 g/m$^2$ and a thickness of 36 µm and comprising 100% of NBKP was subjected to pressing by a supercalender to adjust the thickness to 25 µm to make a paper having a maximum pore diameter of 6 µm as measured by the bubble point method specified in ASTM F-316-80. This paper and the polypropylene porous film used in Example 17 were bonded to each other in the same manner as in Example 19 to make a composite. This composite was impregnated with a 3% solution of γ-aminopropyltrimethoxysilane (A-1110 manufactured by Nippon Unicar Co., Ltd.), followed by curing with heating to make a composite to which 6.6% of the organosilicon compound based on the weight of NBKP was applied. The resulting composite was used as a separator for non-aqueous electrolyte batteries.

Example 38

A composite to which 5.3% of the organosilicon compound based on the weight of NBKP was applied was made in the same manner as in Example 37, except that the composite was coated with the γ-aminopropyltrimethoxysilane prepared in Example 37. The composite was used as a separator for non-aqueous electrolyte batteries.

Example 39

A composite to which 3.7% of the organosilicon compound based on the weight of NBKP was applied was made in the same manner as in Example 37, except that the composite was sprayed with the γ-aminopropyltrimethoxysilane prepared in Example 37. The composite was used as a separator for non-aqueous electrolyte batteries.

Example 40

100% of NBKP having a Canadian standard freeness of 600 ml was dispersed in water, followed by subjecting to maceration using a pulper to prepare an NBKP slurry. Separately, 50% of polypropylene fibers (PZ manufactured by Daiwa Spinning Co., Ltd.; size: 0.7 denier; fiber length: 5 mm), 40% of polypropylene fine fibers (SWP Y600 manufactured by Mitsui Petrochemical Industries, Ltd.) and 10% of polyvinyl alcohol fibers (VPB107-1X3 manufactured by Kuraray Co., Ltd.) were dispersed in water, followed by subjecting to maceration using a pulper to prepare a fiber slurry. Both the slurries were separately subjected to wet paper making process by a cylinder inclined wire combination paper machine, and the wet papers were put together and bonded to each other by drying to make a composite having a basis weight of 25 g/m$^2$ and a thickness of 87 µm. Then, the resulting composite was impregnated with a 3% solution of γ-glycidoxypropyltrimethoxysilane (A-187 manufactured by Nippon Unicar Co., Ltd.), followed by curing with heating to make a composite to which was applied 11.2% of the organosilicon compound based on the total weight of the NBKP and the polyvinyl alcohol fibers. The composite was used as a separator for non-aqueous electrolyte batteries.

Example 41

A composite made in the same manner as in Example 40 was subjected to pressing by a supercalender to adjust the thickness to 60 µm to make a composite having a maximum pore diameter of 16 µm as measured by the bubble point method specified in ASTM F-316-80. This was used as a separator for non-aqueous electrolyte batteries.

Example 42

A composite made in the same manner as in Example 40 was subjected to hot pressing at a processing temperature of 110° C. by a hot calender to adjust the thickness to 40 µm to make a composite having a maximum pore diameter of 10 µm as measured by the bubble point method specified in ASTM F-316-80. This was used as a separator for non-aqueous electrolyte batteries.

Example 43

The polypropylene fibers and polyvinyl alcohol fibers used in Example 40 were dispersed at a ratio of 90% and 10% in water, followed by subjecting to maceration using a pulper to prepare a fiber slurry. Then, the slurry was subjected to wet paper making process using a Fourdrinier paper machine. The resulting wet sheet was impregnated with the γ-aminopropyltrimethoxysilane solution prepared in Example 5, followed by curing with heating to make a nonwoven fabric having a basis weight of 30 g/m$^2$ and a thickness of 133 μm to which the organosilicon compound was applied. The resulting nonwoven fabric was used as a separator for non-aqueous electrolyte batteries.

Example 44

A nonwoven fabric made in the same manner as in Example 43 was subjected to pressing by a supercalender to adjust the thickness to 100 μm. This was used as a separator for non-aqueous electrolyte batteries.

Example 45

A nonwoven fabric made in the same manner as in Example 43 was subjected to hot pressing at a processing temperature of 120° C. by a hot calender to adjust the thickness to 60 μm to make a nonwoven fabric having a maximum pore diameter of 12 μm as measured by the bubble point method specified in ASTM F-316-80. This was used as a separator for non-aqueous electrolyte batteries.

Example 46

The wet paper making process was conducted in the same manner as in Example 43, and the resulting wet sheet was dried and then impregnated with the γ-aminopropyltrimethoxysilane solution prepared in Example 5, followed by curing with heating to make a nonwoven fabric to which 0.1% of the organosilicon compound based on the weight of the polyvinyl alcohol fibers was applied. The resulting nonwoven fabric was used as a separator for non-aqueous electrolyte batteries.

Example 47

A nonwoven fabric made in the same manner as in Example 46 was subjected to pressing by a supercalender to adjust the thickness to 100 μm. This was used as a separator for non-aqueous electrolyte batteries.

Example 48

A nonwoven fabric made in the same manner as in Example 46 was subjected to hot pressing at a processing temperature of 120° C. by a hot calender to adjust the thickness to 60 μm to make a nonwoven fabric having a maximum pore diameter of 12 μm as measured by the bubble point method specified in ASTM F-316-80. This was used as a separator for non-aqueous electrolyte batteries.

Example 49

The fibers used in Example 43 were dispersed at the same ratio as in Example 43 in the γ-aminopropyltrimethoxysilane solution prepared in Example 5, followed by subjecting to maceration using a pulper to prepare a fiber slurry. The slurry was subjected wet paper making process using a Fourdrinier paper machine, followed by curing with heating to make a nonwoven fabric having a basis weight of 30 g/m$^2$ and a thickness of 133 μm to which the organosilicon compound was applied. The resulting nonwoven fabric was used as a separator for non-aqueous electrolyte batteries.

Example 50

The wet paper making process was carried out in the same manner as in Example 49, and the resulting wet sheet was impregnated with the γ-aminopropyltrimethoxysilane solution prepared in Example 5, followed by curing with heating to make a nonwoven fabric having a basis weight of 30 g/m$^2$ and a thickness of 133 μm to which the organosilicon compound was applied. This was used as a separator for non-aqueous electrolyte batteries.

Example 51

A nonwoven fabric made in the same manner as in Example 50 was subjected to pressing by a supercalender to adjust the thickness to 100 μm. This was used as a separator for non-aqueous electrolyte batteries.

Example 52

A nonwoven fabric made in the same manner as in Example 50 was subjected to hot pressing at a processing temperature of 120° C. by a hot calender to adjust the thickness to 60 μm to make a nonwoven fabric having a maximum pore diameter of 12 μm as measured by the bubble point method specified in ASTM F-316-80. This was used as a separator for non-aqueous electrolyte batteries.

Example 53

The wet paper making process was carried out in the same manner as in Example 49, and the resulting wet sheet was dried and impregnated with the γ-aminopropyltrimethoxysilane solution prepared in Example 5, followed by curing with heating to make a nonwoven fabric having a basis weight of 30 g/m$^2$ and a thickness of 133 μm to which the organosilicon compound was applied. This was used as a separator for non-aqueous electrolyte batteries.

Example 54

A nonwoven fabric made in the same manner as in Example 53 was subjected to pressing by a supercalender to adjust the thickness to 100 μm. This was used as a separator for non-aqueous electrolyte batteries.

Example 55

A nonwoven fabric made in the same manner as in Example 53 was subjected to hot pressing at a processing temperature of 120° C. by a hot calender to adjust the thickness to 60 μm to make a nonwoven fabric having a maximum pore diameter of 12 μm as measured by the bubble point method specified in ASTM F-316-80. This was used as a separator for non-aqueous electrolyte batteries.

Example 56

NBKP having a Canadian standard freeness of 600 ml was dispersed in water, followed by subjecting to maceration using a pulper to prepare a slurry. The slurry was subjected to wet paper making process using a cylinder paper machine to make a paper having a basis weight of 30 gm$^2$ and a thickness of 76 μm. Then, the resulting paper was subjected to pressing by a supercalender to adjust the thickness to 45 μm to make a paper having a maximum pore diameter of 10 μm as measured by the bubble point method specified in ASTM F-316-80. Then, this paper was impregnated with the γ-glycidoxypropyltrimethoxysilane solution prepared in Example 3, followed by curing with heating to make a paper to which 5.5% of the organosilicon compound was applied. The paper was used as a separator for non-aqueous electrolyte batteries.

Example 57

A paper to which 4.6% of the organosilicon compound was applied was made in the same manner as in Example 56, except that the paper was coated with the γ-glycidoxypropyltrimethoxysilane solution prepared in Example 3 in stead of being impregnated. The resulting paper was used as a separator for non-aqueous electrolyte batteries.

Example 58

A paper to which 2.7% of the organosilicon compound was applied was made in the same manner as in Example 56, except that the paper was sprayed with the γ-glycidoxypropyltrimethoxysilane solution prepared in Example 3 in stead of being impregnated. The resulting paper was used as a separator for non-aqueous electrolyte batteries.

Example 59

NBKP was dispersed in the γ-glycidoxypropyltrimethoxysilane solution prepared in Example 3 and beaten using a refiner to prepare an NBKP slurry having a Canadian standard freeness of 200 ml in which at least a part of NBKP was fibrillated to a fiber diameter of 1 μm or less. Then, the slurry was subjected to wet paper making process using a cylinder paper machine, followed by curing with heating to make a paper having a basis weight of 30 g/m$^2$ and a thickness of 76 μm to which the organosilicon compound was applied. The resulting paper was used as a separator for non-aqueous electrolyte batteries.

Example 60

The wet paper making process was carried out in the same manner as in Example 59, and the resulting sheet after dried was subjected to pressing by a supercalender to adjust the thickness to 45 μm to make a paper having a maximum pore diameter of 10 μm as measured by the bubble point method specified in ASTM F-316-80. This paper was used as a separator for non-aqueous electrolyte batteries.

Example 61

A paper made in the same manner as in Example 60 was impregnated with the γ-glycidoxypropyltrimethoxysilane solution prepared in Example 3, followed by curing with heating to make a paper to which the organosilicon compound was applied. The paper was used as a separator for non-aqueous electrolyte batteries.

Example 62

A paper to which the organosilicon compound was applied was made in the same manner as in Example 61, except that the paper was coated with the γ-glycidoxypropyltrimethoxysilane solution prepared in Example 3 in stead of being impregnated. The resulting paper was used as a separator for non-aqueous electrolyte batteries.

Example 63

A paper to which the organosilicon compound was applied was made in the same manner as in Example 61, except the paper was sprayed with the γ-glycidoxypropyltrimethoxysilane solution prepared in Example 3 in stead of impregnated. The resulting paper was used as a separator for non-aqueous electrolyte batteries.

Example 64

50% of micro-glass fibers having an average fiber diameter of 0.65 μm and comprising 99.8% of silicon dioxide (Q-FIBER, 106Q manufactured by Schuller Co., Ltd.) and 50% of core-sheath composite fibers comprising polypropylene and polyethylene (NBF-H manufactured by Daiwa Spinning Co., Ltd.; size: 0.7 denier; fiber length: 5 mm) were dispersed in water, followed by subjecting to maceration using a pulper to prepare a fiber slurry. Then, the slurry was subjected to wet paper making process by a cylinder paper machine. The resulting wet sheet was sprayed with the tetraisopropoxytitanium solution prepared in Example 1, followed by curing with heating to make a nonwoven fabric having a basis weight of 20 g/m$^2$ and a thickness of 83 μm to which 0.2% of a hydrolyzate of the organotitanium compound based on the weight of the micro-glass fibers was applied. The resulting nonwoven fabric was used as a separator for non-aqueous electrolyte batteries.

Example 65

A nonwoven fabric made in the same manner as in Example 64 was subjected to pressing by a supercalender to adjust the thickness to 50 μm to make a nonwoven fabric having a maximum pore diameter of 14 μm as measured by the bubble point method specified in ASTM F-316-80. This nonwoven fabric was used as a separator for non-aqueous electrolyte batteries.

Example 66

Acetic acid was added to a mixed solution of methanol and water (1:1) so as to give an acetic acid concentration of 1%. Therein was dissolved methyltriethoxysilane (A-162 manufactured by Nippon Unicar Co., Ltd.) so as to give a concentration of 0.5% to prepare a methyltriethoxysilane solution. 20% of the micro-glass fibers used in Example 64, 35% of the polypropylene fine fibers used in Example 40 and 45% of the core-sheath composite fibers used in Example 64 were dispersed in water, followed by subjecting to maceration using a pulper to prepare a fiber slurry. Then, the slurry was subjected to wet paper making process by a cylinder paper machine. The resulting sheet after dried was subjected to hot pressing at a processing temperature of 110° C. by a hot calender to make a nonwoven fabric having a basis weight of 25 g/m$^2$ and a thickness of 50 μm and having a maximum pore diameter of 6 μm as measured by the bubble point method specified in ASTM F-316-80. This nonwoven fabric was impregnated with the methyltriethoxysilane solution prepared in this example, followed by curing with heating to make a nonwoven fabric to which 0.8% of the organosilicon compound based on the micro-glass fibers was applied. This was used as a separator for non-aqueous electrolyte batteries.

Example 67

A nonwoven fabric to which 0.3% of the organosilicon compound based on the weight of the micro-glass fibers was applied was made in the same manner as in Example 66, except that the nonwoven fabric was coated with the methyltriethoxysilane solution prepared in Example 66 in stead of being impregnated. The resulting nonwoven fabric was used as a separator for non-aqueous electrolyte batteries.

Example 68

A nonwoven fabric to which 0.06% of the organosilicon compound based on the weight of the micro-glass fibers was applied was made in the same manner as in Example 66, except that the nonwoven fabric was sprayed with the methyltriethoxysilane solution prepared in Example 66 in stead of being impregnated. The resulting nonwoven fabric was used as a separator for non-aqueous electrolyte batteries.

Example 69

The fibers used in Example 66 were dispersed at the same ratio as in Example 66 in the methyltriethoxysilane solution prepared in Example 66, followed by subjecting to maceration using a pulper to prepare a fiber slurry. Then, the slurry was subjected to wet paper making process using a cylinder paper machine, followed by curing with heating to make a nonwoven fabric having a basis weight of 25 g/m$^2$ and a thickness of 104 μm to which the organosilicon compound was applied. The resulting nonwoven fabric was used as a separator for non-aqueous electrolyte batteries.

Example 70

The wet paper making process was carried out in the same manner as in Example 69, and the resulting sheet after dried was subjected to hot pressing at a processing temperature of 110° C. by a hot calender to adjust the thickness to 50 μm to make a nonwoven fabric having a maximum pore diameter of 6 μm as measured by the bubble point method specified in ASTM F-316-80. This nonwoven fabric was used as a separator for non-aqueous electrolyte batteries.

Example 71

A nonwoven fabric made in the same manner as in Example 70 was impregnated with the methyltriethoxysilane solution prepared in Example 66, followed by curing with heating to make a nonwoven fabric to which the organosilicon compound was applied. This nonwoven fabric was used as a separator for non-aqueous electrolyte batteries.

Example 72

A nonwoven fabric made in the same manner as in Example 70 was coated with the methyltriethoxysilane solution prepared in Example 66, followed by curing with heating to make a nonwoven fabric to which the organosilicon compound was applied. This nonwoven fabric was used as a separator for non-aqueous electrolyte batteries.

Example 73

A nonwoven fabric made in the same manner as in Example 70 was sprayed with the methyltriethoxysilane solution prepared in Example 66, followed by curing with heating to make a nonwoven fabric to which the organosilicon compound was applied. This nonwoven fabric was used as a separator for non-aqueous electrolyte batteries.

Example 74

A mixed solution comprising 1% of titanium lactate (ORGATIX TC-310 manufactured by Matsumoto Seiyaku Kogyo Co., Ltd.) and 99% of ethanol was prepared. 40% of the micro-glass fibers used in Example 64, 20% of polyimide fibers (P-84 manufactured by Toyobo Co., Ltd.) and 40% of the core-sheath composite fibers used in Example 64 were dispersed in water, followed by subjecting to maceration by a pulper to prepare a fiber slurry. Then, the slurry was subjected to wet paper making process by a cylinder paper machine and the resulting sheet after dried was sprayed with the titanium lactate solution prepared in this example, followed by hot-air drying to make a nonwoven fabric having a basis weight of 30 g/m$^2$ and a thickness of 135 μm to which 2.4% of a hydrolyzate of the organotitanium compound based on the weight of the micro-glass fibers was applied. The resulting nonwoven fabric was used as a separator for non-aqueous electrolyte batteries.

Example 75

A nonwoven fabric made in the same manner as in Example 74 was subjected to pressing by a supercalender to adjust the thickness to 80 μm to make a nonwoven fabric having a maximum pore diameter of 18 μm as measured by the bubble point method specified in ASTM F-316-80. This nonwoven fabric was used as a separator for non-aqueous electrolyte batteries.

Example 76

A nonwoven fabric made in the same manner as in Example 74 was subjected to hot pressing at a processing temperature of 100° C. by a hot calender to adjust the thickness to 50 μm to make a nonwoven fabric having a maximum pore diameter of 12 μm as measured by the bubble point method specified in ASTM F-316-80. This nonwoven fabric was used as a separator for non-aqueous electrolyte batteries.

Example 77

50% of the micro-glass fibers used in Example 64, 40% of the core-sheath composite fibers used in Example 64 and 10% of the polyvinyl alcohol fibers used in Example 40 were dispersed in water, followed by subjecting to maceration by a pulper to prepare a fiber slurry. Then, the slurry was subjected to wet paper making process by a cylinder paper machine and the resulting sheet after dried was coated with the tetra-n-butoxytitanium solution prepared in Example 33, followed by hot-air drying to make a nonwoven fabric having a basis weight of 30 g/m$^2$ and a thickness of 135 μm to which was applied 1.7% of a hydrolyzate of the organotitanium compound based on the total weight of the micro-glass fibers and the polyvinyl alcohol fibers. The resulting nonwoven fabric was used as a separator for non-aqueous electrolyte batteries.

Example 78

A nonwoven fabric made in the same manner as in Example 77 was subjected to pressing by a supercalender to adjust the thickness to 70 μm to make a nonwoven fabric having a maximum pore diameter of 12 μm as measured by the bubble point method specified in ASTM F-316-80. This nonwoven fabric was used as a separator for non-aqueous electrolyte batteries.

Example 79

A nonwoven fabric made in the same manner as in Example 77 was subjected to hot pressing at a processing temperature of 100° C. by a hot calender to adjust the thickness to 50 μm to make a nonwoven fabric having a maximum pore diameter of 8 μm as measured by the bubble point method specified in ASTM F-316-80. This nonwoven fabric was used as a separator for non-aqueous electrolyte batteries.

Example 80

NBKP was dispersed in water and beaten using a refiner to prepare an NBKP slurry having a Canadian standard freeness of 230 ml in which at least a part of NBKP was fibrillated to a fiber diameter of 1 μm or less. Polyarylate fibers (VECTRAN manufactured by Kuraray Co., Ltd.; size: 2.5 deniers; fiber length: 5 mm) and the polypropylene fibers used in Example 40 were dispersed in the said slurry at NBKP:polyarylate fibers:polypropylene fibers=50:20:30, followed by subjecting to maceration using a pulper to prepare a fiber slurry containing fibers at least a part of which were fibrillated to a fiber diameter of 1 μm or less. Then, the slurry was subjected to wet paper making process using a cylinder paper machine. The resulting sheet after dried was impregnated with the methyltriethoxysilane solution prepared in Example 66, followed by curing with heating to make a nonwoven fabric having a basis weight of 20 g/m$^2$ and a thickness of 73 μm to which 4.5% of the organosilicon compound based on the weight of NBKP was applied. The resulting nonwoven fabric was used as a separator for non-aqueous electrolyte batteries.

Example 81

The wet paper making process was carried out in the same manner as in Example 80. The resulting sheet after dried was coated with the methyltriethoxysilane solution prepared in Example 66, followed by curing with heating to make a nonwoven fabric having a basis weight of 20 g/m$^2$ and a thickness of 73 μm to which 3.7% of the organosilicon compound based on the weight of NBKP was applied. The resulting nonwoven fabric was used as a separator for non-aqueous electrolyte batteries.

Example 82

The wet paper making process was carried out in the same manner as in Example 80. The resulting sheet after dried was sprayed with the methyltriethoxysilane solution prepared in Example 66, followed by curing with heating to make a nonwoven fabric having a basis weight of 20 g/m$^2$ and a thickness of 73 μm to which 2.4% of the organosilicon compound based on the weight of NBKP was applied. The resulting nonwoven fabric was used as a separator for non-aqueous electrolyte batteries.

Example 83

Acetic acid was added to a mixed solution of methanol and water (1:1) so as to give an acetic acid concentration of 1%. Therein was dissolved methyltriethoxysilane (A-162 manufactured by Nippon Unicar Co., Ltd.) so as to give a concentration of 3% to prepare a methyltriethoxysilane solution. NBKP was dispersed in this methyltriethoxysilane solution and beaten by a refiner to prepare an NBKP slurry having a Canadian standard freeness of 230 ml in which at least a part of NBKP was fibrillated to a fiber diameter of 1 μgm or less. The polyarylate fibers and polypropylene fibers used in Example 80 were dispersed in the said slurry at NBKP:polyarylate fibers:polypropylene fibers=50:20:30, followed by subjecting to maceration using a pulper to prepare a fiber slurry containing fibers at least a part of which were fibrillated to a fiber diameter of 1 μm or less. Then, the slurry was subjected to wet paper making process using a cylinder paper machine, followed by curing with heating to make a nonwoven fabric having a basis weight of 20 g/m$^2$ and a thickness of 73 μm to which the organosilicon compound was applied. The resulting nonwoven fabric was used as a separator for non-aqueous electrolyte batteries.

Example 84

The wet paper making process was carried out in the same manner as in Example 83. The resulting sheet after dried was impregnated with the methyltriethoxysilane solution prepared in Example 66, followed by curing with heating to make a nonwoven fabric having a basis weight of 20 g/m$^2$ and a thickness of 73 μm to which the organosilicon compound was applied. The resulting nonwoven fabric was used as a separator for non-aqueous electrolyte batteries.

Example 85

The wet paper making process was carried out in the same manner as in Example 83. The resulting sheet after dried was coated with the methyltriethoxysilane solution prepared in Example 66, followed by curing with heating to make a nonwoven fabric to which the organosilicon compound was applied. The resulting nonwoven fabric was used as a separator for non-aqueous electrolyte batteries.

Example 86

The wet paper making process was carried out in the same manner as in Example 83. The resulting sheet after dried was sprayed with the methyltriethoxysilane solution prepared in Example 66, followed by curing with heating to make a nonwoven fabric to which the organosilicon compound was applied. The resulting nonwoven fabric was used as a separator for non-aqueous electrolyte batteries.

Example 87

The polypropylene fine fibers, polypropylene fibers and polyvinyl alcohol fibers used in Example 40 were dispersed in water at a ratio of 45%, 45% and 10%, followed by subjecting to maceration by a pulper to prepare a fiber slurry. Then, the slurry was subjected to wet paper making process by a cylinder paper machine and the resulting wet sheet was impregnated with the titanium lactate solution prepared in Example 74, followed by hot-air drying to make a nonwoven fabric having a basis weight of 25 g/m$^2$ and a thickness of 104 μm to which 0.3% of a hydrolyzate of the organotitanium compound based on the weight of the polyvinyl alcohol fibers was applied. The resulting nonwoven fabric was used as a separator for non-aqueous electrolyte batteries.

Example 88

A nonwoven fabric made in the same manner as in Example 87 was subjected to pressing by a supercalender to adjust the thickness to 60 μm to make a nonwoven fabric having a maximum pore diameter of 14 μm as measured by the bubble point method specified in ASTM F-316-80. This nonwoven fabric was used as a separator for non-aqueous electrolyte batteries.

Example 89

A nonwoven fabric made in the same manner as in Example 87 was subjected to hot pressing at a processing temperature of 120° C. by a hot calender to adjust the thickness to 45 μm to make a nonwoven fabric having a maximum pore diameter of 7 μm as measured by the bubble point method specified in ASTM F-316-80. This nonwoven fabric was used as a separator for non-aqueous electrolyte batteries.

Example 90

40% of the micro-glass fibers used in Example 64, 10% of bacteria cellulose, 40% of the core-sheath composite fibers used in Example 64 and 10% of polyvinyl alcohol fibers (SPGO56-11X3 manufactured by Kuraray Co., Ltd.) were dispersed in water, followed by subjecting to maceration using a pulper to prepare a fiber slurry containing fibers at least a part of which were fibrillated to a fiber diameter of 1 μm or less. Then, the slurry was subjected to wet paper making process by a cylinder paper machine. The resulting wet sheet was sprayed with the γ-aminopropyltrimethoxysilane solution prepared in Example 37, followed by curing with heating to make a nonwoven fabric having a basis weight of 20 g/m$^2$ and a thickness of 81 μm to which the organosilicon compound was applied. The resulting nonwoven fabric was used as a separator for non-aqueous electrolyte batteries.

Example 91

A nonwoven fabric made in the same manner as in Example 90 was subjected to pressing by a supercalender to adjust the thickness to 60 μm to make a nonwoven fabric having a maximum pore diameter of 11 μm as measured by the bubble point method specified in ASTM F-316-80. This nonwoven fabric was used as a separator for non-aqueous electrolyte batteries.

Example 92

A nonwoven fabric made in the same manner as in Example 90 was subjected to hot pressing at a processing temperature of 110° C. by a hot calender to adjust the thickness to 40 μm to make a nonwoven fabric having a maximum pore diameter of 5 μm as measured by the bubble point method specified in ASTM F-316-80. This nonwoven fabric was used as a separator for non-aqueous electrolyte batteries.

Example 93

The fibers used in Example 90 were dispersed at the same ratio as in Example 90 in the γ-aminopropyltrimethoxysilane solution prepared in Example 37, followed by subjecting to maceration using a pulper to prepare a fiber slurry containing fibers at least a part of which were fibrillated to a fiber diameter of 1 μm or less. Then, the slurry was subjected to wet paper making process by a cylinder paper machine, followed by curing with heating to make a nonwoven fabric having a basis weight of 20 g/m$^2$ and a thickness of 81 μm to which the organosilicon compound was applied. The resulting nonwoven fabric was used as a separator for non-aqueous electrolyte batteries.

Example 94

The wet paper making process was carried out in the same manner as in Example 93, and the resulting wet sheet was sprayed with the γ-aminopropyltrimethoxysilane solution prepared in Example 5, followed by curing with heating to make a nonwoven fabric having a basis weight of 20 g/m$^2$ and a thickness of 81 μm to which the organosilicon compound was applied. The resulting nonwoven fabric was used as a separator for non-aqueous electrolyte batteries.

Example 95

A nonwoven fabric made in the same manner as in Example 94 was subjected to pressing by a supercalender to adjust the thickness to 60 μm to make a nonwoven fabric having a maximum pore diameter of 11 μm as measured by the bubble point method specified in ASTM F-316-80. This nonwoven fabric was used as a separator for non-aqueous electrolyte batteries.

Example 96

A nonwoven fabric made in the same manner as in Example 94 was subjected to hot pressing at a processing temperature of 110° C. by a hot calender to adjust the thickness to 40 μm to make a nonwoven fabric having a maximum pore diameter of 5 μm as measured by the bubble point method specified in ASTM F-316-80. This nonwoven fabric was used as a separator for non-aqueous electrolyte batteries.

Example 97

40% of the micro-glass fibers used in Example 64, 15% of the polyimide fibers used in Example 74, 35% of the core-sheath composite fibers used in Example 64 and 10% of polyvinyl alcohol fibers (SPGO56-11X3 manufactured by Kuraray Co., Ltd.) were dispersed in water, followed by subjecting to maceration using a pulper to prepare a fiber slurry. Then, the slurry was subjected to wet paper making process by a cylinder paper machine. The resulting sheet after dried was coated with the γ-glycidoxypropyltrimethoxysilane solution prepared in Example 3, followed by curing with heating to make a nonwoven fabric having a basis weight of 15 g/m$^2$ and a thickness of 62 μm to which was applied 1.9% of the organosilicon compound based on the total weight of the micro-glass fibers and the polyvinyl alcohol fibers. The resulting nonwoven fabric was used as a separator for non-aqueous electrolyte batteries.

Example 98

A nonwoven fabric made in the same manner as in Example 97 was subjected to pressing by a supercalender to adjust the thickness to 45 μm to make a nonwoven fabric having a maximum pore diameter of 16 μm as measured by the bubble point method specified in ASTM F-316-80. This nonwoven fabric was used as a separator for non-aqueous electrolyte batteries.

Example 99

A nonwoven fabric made in the same manner as in Example 97 was subjected to hot pressing at a processing temperature of 110° C. by a hot calender to adjust the thickness to 30 μm to make a nonwoven fabric having a maximum pore diameter of 10 μm as measured by the bubble point method specified in ASTM F-316-80. This nonwoven fabric was used as a separator for non-aqueous electrolyte batteries.

Example 100

The fibers used in Example 97 were dispersed at the same ratio as in Example 97 in the γ-glycidoxypropyltrimethoxysilane solution prepared in Example 40, followed by subjecting to maceration using a pulper to prepare a fiber slurry. Then, the slurry was subjected to wet paper making process by a cylinder paper machine, followed by curing with heating to make a nonwoven fabric having a basis weight of 15 g/m$^2$ and a thickness of 62 μm to which the organosilicon compound was applied. The resulting nonwoven fabric was used as a separator for non-aqueous electrolyte batteries.

Example 101

The wet paper making process was carried out in the same manner as in Example 100, and the resulting sheet after dried was coated with the γ-glycidoxypropyltrimethoxysilane solution prepared in Example 3, followed by curing with heating to make a nonwoven fabric having a basis weight of 15 g/m² and a thickness of 62 μm to which the organosilicon compound was applied. The resulting nonwoven fabric was used as a separator for non-aqueous electrolyte batteries.

Example 102

A nonwoven fabric made in the same manner as in Example 101 was subjected to pressing by a supercalender to adjust the thickness to 45 μm to make a nonwoven fabric having a maximum pore diameter of 16 μm as measured by the bubble point method specified in ASTM F-316-80. This nonwoven fabric was used as a separator for non-aqueous electrolyte batteries.

Example 103

A nonwoven fabric made in the same manner as in Example 101 was subjected to hot pressing at a processing temperature of 100° C. by a hot calender to adjust the thickness to 30 μm to make a nonwoven fabric having a maximum pore diameter of 10 μm as measured by the bubble point method specified in ASTM F-316-80. This nonwoven fabric was used as a separator for non-aqueous electrolyte batteries.

Example 104

30% of bacteria cellulose, 25% of the micro-glass fibers used in Example 64, 15% of the polyarylate fibers used in Example 80 and 30% of the core-sheath composite fibers used in Example 64 were dispersed in water, followed by subjecting to maceration using a pulper to prepare a fiber slurry containing fibers at least a part of which were fibrillated to a fiber diameter of 1 μm or less. Then, the slurry was subjected to wet paper making process by a cylinder paper machine. The resulting sheet after dried was sprayed with the γ-glycidoxypropyltrimethoxysilane solution prepared in Example 40, followed by curing with heating to make a nonwoven fabric having a basis weight of 30 g/m² and a thickness of 129 μm to which was applied 5.5% of the organosilicon compound based on the total weight of the bacteria cellulose and the micro-glass fibers. The resulting nonwoven fabric was used as a separator for non-aqueous electrolyte batteries.

Example 105

A nonwoven fabric made in the same manner as in Example 104 was subjected to pressing by a supercalender to adjust the thickness to 60 μm to make a nonwoven fabric having a maximum pore diameter of 14 μm as measured by the bubble point method specified in ASTM F-316-80. This nonwoven fabric was used as a separator for non-aqueous electrolyte batteries.

Example 106

A nonwoven fabric made in the same manner as in Example 104 was subjected to hot pressing at a processing temperature of 100° C. by a hot calender to adjust the thickness to 50 μm to make a nonwoven fabric having a maximum pore diameter of 9 μm as measured by the bubble point method specified in ASTM F-316-80. This nonwoven fabric was used as a separator for non-aqueous electrolyte batteries.

Example 107

The fibers used in Example 104 were dispersed at the same ratio as in Example 104 in the γ-glycidoxypropyltrimethoxysilane solution prepared in Example 3, followed by subjecting to maceration using a pulper to prepare a fiber slurry containing fibers at least a part of which were fibrillated to a fiber diameter of 1 μm or less. Then, the slurry was subjected to wet paper making process by a cylinder paper machine, followed by curing with heating to make a nonwoven fabric having a basis weight of 30 g/m² and a thickness of 129 μm to which the organosilicon compound was applied. The resulting nonwoven fabric was used as a separator for non-aqueous electrolyte batteries.

Example 108

The wet paper making process was carried out in the same manner as in Example 107, and the resulting sheet after dried was sprayed with the γ-glycidoxypropyltrimethoxysilane solution prepared in Example 3, followed by curing with heating to make a nonwoven fabric having a basis weight of 30 g/m² and a thickness of 129 μm to which the organosilicon compound was applied. The resulting nonwoven fabric was used as a separator for non-aqueous electrolyte batteries.

Example 109

A nonwoven fabric made in the same manner as in Example 108 was subjected to pressing by a supercalender to adjust the thickness to 60 μm to make a nonwoven fabric having a maximum pore diameter of 14 μm as measured by the bubble point method specified in ASTM F-316-80. This nonwoven fabric was used as a separator for non-aqueous electrolyte batteries.

Example 110

A nonwoven fabric made in the same manner as in Example 108 was subjected to hot pressing at a processing temperature of 100° C. by a hot calender to adjust the thickness to 50 μm to make a nonwoven fabric having a maximum pore diameter of 9 μm as measured by the bubble point method specified in ASTM F-316-80. This nonwoven fabric was used as a separator for non-aqueous electrolyte batteries.

Example 111

The polyarylate fibers used in Example 80 were dispersed in water and beaten by a refiner to prepare a polyarylate fiber slurry having a Canadian standard freeness of 350 ml in which at least a part of the fibers were fibrillated to a fiber diameter of 1 μm or less. Separately, the core-sheath composite fibers used in Example 64 and the polyvinyl alcohol fibers used in Example 40 were dispersed in water at the given ratio of polyarylate fibers:core-sheath composite fibers:polyvinyl alcohol fibers=40:50:10, followed by subjecting to maceration using a pulper to prepare a fiber slurry. Then, these slurries were mixed and the mixture was subjected to wet paper making process using a cylinder paper machine. The resulting wet sheet was impregnated with the methyltrimethoxysilane solution prepared in Example 8, followed by curing with heating to make a nonwoven fabric to which the organosilicon compound was applied. This nonwoven fabric was subjected to hot pressing at a processing temperature of 110° C. by a hot calender to make a nonwoven fabric having a basis weight of 20 g/m² and a thickness of 32 μm and having a maximum pore diameter of 5 μm as measured by the bubble point method specified in ASTM F-316-80. This nonwoven fabric was used as a separator for non-aqueous electrolyte batteries.

Example 112

The wet paper making process was carried out in the same manner as in Example 111, and the resulting wet sheet was sprayed with the methyltrimethoxysilane solution prepared in Example 8, followed by curing with heating to make a nonwoven fabric having a basis weight of 20 g/m² and a thickness of 86 μm to which the organosilicon compound was applied. This nonwoven fabric was subjected to hot pressing by a hot calender to adjust the thickness to 32 μm to make a nonwoven fabric having a maximum pore diameter of 5 μm as measured by the bubble point method specified in ASTM F-316-80. The resulting nonwoven fabric was used as a separator for non-aqueous electrolyte batteries.

Example 113

The polyarylate fibers used in Example 80 were dispersed in the methyltrimethoxysilane solution prepared in Example 34 and beaten by a refiner to prepare a polyarylate fiber slurry having a Canadian standard freeness of 300 ml in which at least a part of the fibers were fibrillated to a fiber diameter of 1 μm or less. Separately, the core-sheath composite fibers used in Example 64 and the polyvinyl alcohol fibers used in Example 90 were dispersed in water at the given ratio of polyarylate fibers:core-sheath composite fibers:polyvinyl alcohol fibers=40:50:10, followed by subjecting to maceration using a pulper to prepare a fiber slurry. Then, these slurries were mixed and the mixture was subjected to wet paper making process using a cylinder paper machine, followed by curing with heating to make a nonwoven fabric to which the organosilicon compound was applied. This nonwoven fabric was used as a separator for non-aqueous electrolyte batteries.

Example 114

The wet paper making process was carried out in the same manner as in Example 113, and the resulting wet sheet was impregnated with the methyltrimethoxysilane solution prepared in Example 8, followed by curing with heating to make a nonwoven fabric having a basis weight of 20 g/m² and a thickness of 86 μm to which the organosilicon compound was applied. This nonwoven fabric was subjected to hot pressing at a processing temperature of 110° C. by a hot calender to adjust the thickness to 32 μm to make a nonwoven fabric having a maximum pore diameter of 5 μm as measured by the bubble point method specified in ASTM F-316-80. The resulting nonwoven fabric was used as a separator for non-aqueous electrolyte batteries.

Example 115

The wet paper making process was carried out in the same manner as in Example 113, and the resulting wet sheet was sprayed with the methyltrimethoxysilane solution prepared in Example 8, followed by curing with heating to make a nonwoven fabric having a basis weight of 20 g/m² and a thickness of 86 μm to which the organosilicon compound was applied. This nonwoven fabric was subjected to hot pressing at a processing temperature of 110° C. by a hot calender to adjust the thickness to 32 μm to make a nonwoven fabric having a maximum pore diameter of 5 μm as measured by the bubble point method specified in ASTM F-316-80. The resulting nonwoven fabric was used as a separator for non-aqueous electrolyte batteries.

Example 116

The polyarylate fibers used in Example 80 were dispersed in water and beaten by a refiner to prepare a polyarylate fiber slurry having a Canadian standard freeness of 300 ml in which at least a part of the fibers were fibrillated to a fiber diameter of 1 μm or less. Separately, the micro-glass fibers used in Example 64, the core-sheath composite fibers used in Example 64 and the polyvinyl alcohol fibers used in Example 40 were dispersed in water at the given ratio of polyarylate fibers:micro-glass fibers:core-sheath composite fibers:polyvinyl alcohol fibers=40:20:35:5, followed by subjecting to maceration using a pulper to prepare a fiber slurry. Then, these slurries were mixed and the mixture was subjected to wet paper making process using a cylinder paper machine. The resulting sheet after dried was impregnated with the methyltrimethoxysilane solution prepared in Example 34, followed by curing with heating to make a nonwoven fabric having a basis weight of 25 g/m² and a thickness of 102 μm to which was applied 2.3% of the organosilicon compound based on the total weight of the micro-glass fibers and the polyvinyl alcohol fibers. This nonwoven fabric was subjected to hot pressing at a processing temperature of 110° C. by a hot calender to adjust the thickness to 40 μm to make a nonwoven fabric having a maximum pore diameter of 4 μm as measured by the bubble point method specified in ASTM F-316-80. This nonwoven fabric was used as a separator for non-aqueous electrolyte batteries.

Example 117

The wet paper making process was carried out in the same manner as in Example 116, and the resulting sheet after dried was coated with the methyltrimethoxysilane solution prepared in Example 34, followed by curing with heating to make a nonwoven fabric having a basis weight of 25 g/m² and a thickness of 102 μm to which was applied 1.5% of the organosilicon compound based on the total weight of the micro-glass fibers and the polyvinyl alcohol fibers. This nonwoven fabric was subjected to hot pressing at a processing temperature of 110° C. by a hot calender to adjust the thickness to 40 μm to make a nonwoven fabric having a maximum pore diameter of 4 μm as measured by the bubble point method specified in ASTM F-316-80. The resulting nonwoven fabric was used as a separator for non-aqueous electrolyte batteries.

Example 118

The wet paper making process was carried out in the same manner as in Example 116, and the resulting sheet after dried was sprayed with the methyltrimethoxysilane solution prepared in Example 34, followed by curing with heating to make a nonwoven fabric having a basis weight of 25 g/m² and a thickness of 102 μm to which was applied 0.7% of the organosilicon compound based on the total weight of the micro-glass fibers and the polyvinyl alcohol fibers. This nonwoven fabric was subjected to hot pressing at a processing temperature of 110° C. by a hot calender to adjust the thickness to 40 μm to make a nonwoven fabric having a maximum pore diameter of 4 μm as measured by the bubble point method specified in ASTM F-316-80. The resulting nonwoven fabric was used as a separator for non-aqueous electrolyte solution.

Example 119

The wet paper making process was carried out in the same manner as in Example 116, and the resulting sheet after dried was subjected to hot pressing at a processing temperature of 110° C. by a hot calender to make a nonwoven fabric having a basis weight of 25 g/m² and a thickness of 40 μm and having a maximum pore diameter of 4 μm as measured by the bubble point method specified in ASTM F-316-80. This nonwoven fabric was impregnated with the methyltrimethoxysilane solution prepared in Example 34, followed by curing with heating to make a nonwoven fabric to which was applied 2.3% of the organosilicon compound based on the total weight of the micro-glass fibers and the polyvinyl alcohol fibers. This nonwoven fabric was used as a separator for non-aqueous electrolyte batteries.

Example 120

Acetic acid was added to a mixed solution of methanol and water (1:1) so as to give an acetic acid concentration of 1%. Therein was dissolved methyltrimethoxysilane (A-163 manufactured by Nippon Unicar Co., Ltd.) so as to give a concentration of 5% to prepare a methyltrimethoxysilane solution. The polyarylate fibers used in Example 80 were dispersed in water and beaten by a refiner to prepare a polyarylate fiber slurry having a Canadian standard freeness of 300 ml in which at least a part of the fibers were fibrillated to a fiber diameter of 1 μm or less. Separately, the micro-glass fibers used in Example 64, the core-sheath composite fibers used in Example 64 and the polyvinyl alcohol fibers used in Example 40 were dispersed in the methyltrimethoxysilane solution prepared in this example at the given ratio of polyarylate fibers:micro-glass fibers:core-sheath composite fibers:polyvinyl alcohol fibers=40:20:35:5, followed by subjecting to maceration using a pulper to prepare a fiber slurry. Then, these slurries were mixed and the mixture was subjected to wet paper making process using a cylinder paper machine, followed by curing with heating to make a nonwoven fabric having a basis weight of 25 g/m$^2$ and a thickness of 102 μm to which the organosilicon compound was applied. This nonwoven fabric was used as a separator for non-aqueous electrolyte batteries.

Example 121

The wet paper making process was carried out in the same manner as in Example 120, and the resulting sheet after dried was impregnated with the methyltrimethoxysilane solution prepared in Example 34, followed by curing with heating to make a nonwoven fabric having a basis weight of 25 g/m$^2$ and a thickness of 102 μm to which the organosilicon compound was applied. This nonwoven fabric was subjected to hot pressing at a processing temperature of 110° C. by a hot calender to adjust the thickness to 40 μm to make a nonwoven fabric having a maximum pore diameter of 4 μm as measured by the bubble point method specified in ASTM F-316-80. The resulting nonwoven was used as a separator for non-aqueous electrolyte batteries.

Example 122

The wet paper making process was carried out in the same manner as in Example 120, and the resulting sheet after dried was coated with the methyltrimethoxysilane solution prepared in Example 34, followed by curing with heating to make a nonwoven fabric having a basis weight of 25 g/m$^2$ and a thickness of 102 μm to which the organosilicon compound was applied. This nonwoven fabric was subjected to hot pressing at a processing temperature of 110° C. by a hot calender to adjust the thickness to 40 μm to make a nonwoven fabric having a maximum pore diameter of 4 μm as measured by the bubble point method specified in ASTM F-316-80. The resulting nonwoven was used as a separator for non-aqueous electrolyte batteries.

Example 123

The wet paper making process was carried out in the same manner as in Example 120, and the resulting sheet after dried was sprayed with the methyltrimethoxysilane solution prepared in Example 34, followed by curing with heating to make a nonwoven fabric having a basis weight of 25 g/m$^2$ and a thickness of 102 μm to which the organosilicon compound was applied. This nonwoven fabric was subjected to hot pressing at a processing temperature of 110° C. by a hot calender to adjust the thickness to 40 μm to make a nonwoven fabric having a maximum pore diameter of 4 μm as measured by the bubble point method specified in ASTM F-316-80. The resulting nonwoven was used as a separator for non-aqueous electrolyte batteries.

Example 124

The wet paper making process was carried out in the same manner as in Example 120, and the resulting sheet after dried was subjected to hot pressing at a processing temperature of 110° C. by a hot calender to make a nonwoven fabric having a basis weight of 25 g/m$^2$ and a thickness of 40 μm and having a maximum pore diameter of 4 μm as measured by the bubble point method specified in ASTM F-316-80. This nonwoven fabric was impregnated with the methyltrimethoxysilane solution prepared in Example 34, followed by curing with heating to make a nonwoven to which the organosilicon compound was applied. The resulting nonwoven fabric was used as a separator for non-aqueous electrolyte batteries.

Comparative Example 1

11% of an ultra-high molecular weight polyethylene having a viscosity-average molecular weight of 3,000,000 (UH-900 manufactured by Asahi Kasei Kogyo K.K.), 8.8% of a high-molecular weight polyethylene having a viscosity-average molecular weight of 480,000 (HIGHZEX MILLION 030S manufactured by Mitsui Petrochemical Industries, Ltd.), 2.2% of an ethylene-propylene rubber having a weight-average molecular weight of 200,000 (EP01P manufactured by Japan Synthetic Rubber Co., Ltd.), 21% of fine powder silicic acid, and 57% of dioctylene phthalate (DOP) were mixed using a Henschel mixer, and the resulting mixture was formed into a film of 150 μm thick using a film producing apparatus comprising a twin-screw extruder of φ30 mm equipped with a T-die of 450 mm wide. The resulting film was immersed in 1,1,1-trichloroethane for 10 minutes to extract DOP, washed with water, dried and further immersed in 25% sodium hydroxide at 60° C. for 60 minutes to extract the fine powder silicic acid, and then dried to make a microporous film. This microporous film was stretched by a single-shaft roll stretching machine heated to 125° C. so as to give a thickness of 25 μm and subjected to a heat treatment for 5 seconds in an atmosphere of 115° C. to make a separator for non-aqueous electrolyte batteries.

Comparative Example 2

The polypropylene porous film used in Example 17 was superposed on a dry process nonwoven fabric comprising a polypropylene resin and having a thickness of 100 μm, followed by hot pressing at 120° C. by a hot calender to bond them to each other to obtain a composite. This composite was used as a separator for non-aqueous electrolyte batteries.

Comparative Example 3

50% of Manila hemp of the Philippines growth having a Canadian standard freeness of 600 ml and 50% of aramid fine fibers (KY-400S manufactured by Daicel Ltd.) were dispersed in water, followed by subjecting to maceration using a pulper to prepare a fiber slurry. Separately, 30% of polypropylene fine fibers (KY-430S manufactured by Daicel Chemical Industries Ltd.) and 70% of core-sheath composite fibers comprising polypropylene and polyethylene (NBF-H manufactured by Daiwa spinning co., Ltd.; size: 0.7 denier; fiber length: 5 mm) were dispersed in water, followed by subjecting to maceration using a pulper to prepare a fiber slurry. Using a cylinder mold inclined wire combination paper machine, the fiber slurry containing Manila hemp was formed into a sheet of 9 g/m$^2$ by the inclined wire and the fiber slurry containing polypropylene fine fibers was formed into a sheet of 19 g/m$^2$ by the cylinder mould at the same time, and the resulting nonwoven fabric was dried by a Yankee dryer adjusted to 135° C. to make a nonwoven fabric having a basis weight of 28 /gm$^2$. This nonwoven fabric was used as a separator for non-aqueous electrolyte batteries.

Comparative Example 4

Polyacrylonitrile fibers having an average major diameter of 0.2 μm, an average minor diameter of 0.04 μm, and an average fiber length of 0.3 mm were dispersed in water to prepare a 0.1% slurry. This slurry was subjected to paper making process in accordance with JIS method to make a nonwoven fabric. This was used as a separator for non-aqueous electrolyte batteries.

Comparative Example 5

Polyethylene fibrous material having an average major diameter of 1.0 μm, an average minor diameter of 0.2 μm, and an average fiber length of 0.6 mm were dispersed in water to prepare a 0.1% slurry. This slurry was subjected to paper making process in accordance with JIS method to make a nonwoven fabric. This was used as a separator for non-aqueous electrolyte batteries.

Comparative Example 6

A binder mainly composed of polyethyl acrylate and containing 0.3% of γ-glycidoxypropyltrimethoxysilane was prepared, and 8% of this binder was applied to a glass fiber nonwoven fabric having a thickness of 200 μm. This nonwoven fabric was used as a separator for non-aqueous electrolyte batteries.

Comparative Example 7

0.05 mol/l of amphipathic compound N-[β-(trimethylammonio)ethyloxybenzoyl]-didodecyl-L-glutamic acid bromide and 0.15 mol/l of methyltrimethoxysilane were subjected to ultrasonic treatment for 3 minutes and dispersed in water. This dispersion was spread on the polypropylene porous film used in Example 17 and was kept at 25° C. and a relative humidity of 60% for 3 days to prepare a multilayer bimolecular film. Then, this film was treated with ammonia gas in a closed glass vessel to hydrolytically condense the methoxysilane group, and the amphipathic compound was removed by extraction with ethyl alcohol to prepare a polysiloxane film on the polypropylene porous film. This composite was used, as it was, as a separator for non-aqueous electrolyte batteries.

Comparative Example 8

The polypropylene porous film made in Comparative Example 7 was interposed between the polypropylene porous film used in Example 17 and a dry process nonwoven fabric comprising polypropylene resin and having a basis weight of 10 g/m$^2$, and the composite was used as a separator for non-aqueous electrolyte batteries.

Comparative Example 9

A film-forming compound dihexadecyl phosphate was mixed with a titanium oxide fine particle sol dispersion (manufactured by Idemitsu Kosan Co., Ltd.), followed by subjecting to ultrasonic dispersion. The resulting dispersion was spread on a fluorocarbon resin porous film and dried at room temperature. The resulting cast film was washed with ethanol and fired at 300° C. to make a titanium oxide film. This titanium oxide film was laminated on the polypropylene porous film used in Example 17, and this laminate was used, as it was, as a separator for non-aqueous electrolyte batteries.

Comparative Example 10

A mixed solution comprising 5% of tetraethoxysilane (KBE04 manufactured by Shin-Etsu Chemical Co., Ltd.), 30% of water and 65% of ethanol was kept under refluxing with stopping the supply of water from the outside air by a calcium chloride tube, and reaction was carried out at 80° C. for 24 hours to prepare a partially gelling solution of a metal oxide precursor. The polypropylene porous film used in Example 17 was impregnated with the resulting solution and then immersed in a warm water of 60° C. for 5 hours to complete the gelation. The film was dried for 30 minutes in a thermostat of 150° C. to make a polypropylene porous film covered with silica gel. This was used as a separator for non-aqueous electrolyte batteries.

Comparative Example 11

Polyethylene oxide (PEO-18 manufactured by Seitetsu Kagaku Co., Ltd.) as a fiber dispersant was dissolved in water so as to give a concentration of 0.2%. In this solution were dispersed glass fibers having an average fiber diameter of 6 μm (manufactured by Asahi Fiber Glass Co., Ltd.), followed by subjecting to maceration using a pulper to prepare a fiber slurry. Then, the slurry was subjected to wet paper making process using an inclined type paper machine, and the resulting sheet was impregnated with the methyltrimethoxysilane solution prepared in Example 7, followed by drying at 150° C. for 1 minute to make a glass fiber nonwoven fabric having a basis weight of 40 g/m$^2$ and a thickness of 193 μm. This nonwoven fabric was used as a separator for non-aqueous electrolyte batteries.

Comparative Example 12

A glass fiber filter paper for high-performance air filters comprising 90% of micro-glass fibers having an average fiber diameter of 1 μm and 10% of glass fibers having an average fiber diameter of 6 μm was sprayed with the methyltrimethoxysilane solution prepared in Example 7, followed by drying at 120° C. for 15 minutes to make a glass fiber filter paper for heat resistant air filters having 2.1% of the organosilicon compound applied thereto and having a Gurley stiffness of 700 mgf.

Comparative Example 13

The paper used in Example 5 was used, as it was, as a separator for non-aqueous electrolyte batteries.

Comparative Example 14

The nonwoven fabric used in Example 8 was used, as it was, as a separator for non-aqueous electrolyte batteries.

51

Comparative Example 15

A nonwoven fabric made in the same manner as in Example 43, except that the organosilicon compound was not applied, was used, as it was, as a separator for non-aqueous electrolyte batteries The separators for non-aqueous electrolyte batteries which were obtained in Examples 1–124 and Comparative Examples 1–15 were subjected to measurements by the following test methods, and the results are shown in Table 5 and the others.

<Battery Fabricability>

Lithium cobaltate was used as a positive electrode, graphitized carbon was used as a negative electrode, and the separator for non-aqueous electrolyte batteries made in each of the Examples and Comparative Examples was arranged in contact with the electrodes, and these were made into an electrode having a spiral structure. Then, an electrolyte was prepared by dissolving $LiClO_4$ in a mixed solvent of ethylene carbonate:diethyl carbonate=1:1 so as to give a concentration of 0.5 mol/l. A cylindrical lithium secondary battery of type 18650 (diameter: 18 mm, length: 65 mm) was fabricated using these electrodes and electrolyte. Presence of non-uniformity and gap between the electrode and the separator, and meandering, slippage and breakage of them at the fabrication were examined to evaluate the fabricability of battery. When the battery could be fabricated uniformly without any gaps, meandering, slippage and breakage, this is indicated by "⊚"; when the battery could be fabricated with no problems though meandering or slippage occurred occasionally, this is indicated by "○"; when some problems occurred, but the battery was practically acceptable, this is indicated by "Δ"; and when problems occurred in the fabricability and the battery was practically unacceptable, this is indicated by "X".

<Heat Resistance>

The separator for non-aqueous electrolyte batteries made in Examples and Comparative Examples was sandwiched between metallic plate electrodes, which were connected with an electrical resistance measuring apparatus so as to be able to measure the electrical resistance. These metallic plates and separator were placed in an electric furnace to heat them up to 510° C., and the temperature and the electrical resistance were measured. When the temperature rises and the separator shrinks, melts or burns and no longer can serve as a separator, the electrical resistance lowers to cause finally short-circuit. The temperature at which the short-circuit occurred was employed as a measure for heat resistance. When this temperature is not lower than 200° C., the heat resistance is good, and when it is 100–200° C., the heat resistance is somewhat inferior, but practically acceptable. When it is not higher than 100° C., the heat resistance is bad. When short-circuit did not occur below 500° C., this is indicated by "500<" in the table.

<Ignition>

One hundred cylindrical lithium secondary batteries mentioned above were fabricated and externally short-circuited with a test circuit according to which the resistance at the short-circuit is 10 mΩ. It was checked whether the battery ignited or not. When no ignition occurred, this is indicated by "○" and when even only one battery ignited, this is indicated by "X".

<Energy Density>

The cylindrical lithium secondary battery fabricated in the same manner as for the test and evaluation of <Battery fabricability> mentioned above was subjected to constant current charging at a current density of 0.2 $mA/cm^2$ to a final voltage of 4.2 V and then discharged at a current density of

52

0.2 $mA/cm^2$ to a final voltage of 2.75 V. From the resulting discharge capacity, the energy density per 1 g of the active material of the positive electrode (mAh/g) was calculated and evaluated. The larger value means the better energy density. In the item of the table, the energy density is abbreviated to "E density".

<Cycle Life>

The cylindrical lithium secondary battery fabricated in the same manner as for the evaluation of <Battery fabricability> mentioned above was subjected to charging and discharging repeatedly 100 times, and the discharge capacity at the 100th cycle was measured and ratio to the discharge capacity at the 1st cycle was obtained to evaluate the cycle life. The higher ratio means the better cycle life.

<Charge Retention Rate>

The cylindrical lithium secondary battery fabricated in the same manner as for the evaluation of <Battery fabricability> mentioned above was stored for 3 months at 60° C. and then the discharge capacity was measured in the same manner as in the testing of <Energy density>, and the ratio to the initial discharge capacity was obtained as a charge retention rate, by which the battery shelf stability was evaluated. The higher charge retention rate means the better battery shelf stability.

TABLE 5

| Example | Battery fabric-ability | Heat resistance ° C. | E density mAh/g | Cycle life % | Charge retention rate % |
|---|---|---|---|---|---|
| 1 | Δ | 200 | 126.5 | 82.3 | 91.2 |
| 2 | ○ | 500< | 115.5 | 77.4 | 86.6 |
| 3 | ○ | 500< | 116.7 | 78.6 | 87.1 |
| 4 | ○ | 500< | 117.0 | 78.6 | 88.0 |
| 5 | ○ | 500< | 116.5 | 78.5 | 87.0 |
| 6 | ○ | 500< | 115.0 | 77.0 | 86.3 |
| 7 | ○ | 500< | 113.1 | 76.3 | 86.0 |
| 8 | ○ | 500< | 123.3 | 64.6 | 74.1 |
| 9 | ○ | 500< | 123.4 | 65.1 | 74.3 |
| 10 | ⊚ | 500< | 123.4 | 65.3 | 74.3 |
| 11 | ⊚ | 500< | 122.0 | 64.0 | 74.0 |
| 12 | ⊚ | 500< | 119.2 | 62.5 | 72.6 |
| 13 | ⊚ | 500< | 123.1 | 65.0 | 74.2 |
| 14 | ⊚ | 500< | 122.0 | 64.0 | 74.0 |
| 15 | ⊚ | 500< | 120.6 | 63.0 | 73.5 |
| 16 | ○ | 500< | 123.0 | 82.5 | 90.9 |
| 17 | ⊚ | 500< | 113.5 | 76.5 | 86.8 |
| 18 | Δ | 500< | 123.3 | 65.1 | 74.5 |
| 19 | ⊚ | 500< | 122.6 | 64.3 | 74.1 |
| 20 | ⊚ | 500< | 119.5 | 62.2 | 73.2 |
| 21 | ○ | 500< | 122.5 | 64.2 | 74.0 |

TABLE 6

| Example | Battery fabric-ability | Heat resistance ° C. | E density mAh/g | Cycle life % | Charge retention rate % |
|---|---|---|---|---|---|
| 22 | ○ | 500< | 122.6 | 64.2 | 74.0 |
| 23 | ○ | 500< | 119.2 | 62.2 | 73.1 |
| 24 | ⊚ | 500< | 119.2 | 62.1 | 73.0 |
| 25 | ○ | 500< | 121.8 | 63.8 | 73.5 |
| 26 | ○ | 500< | 122.0 | 63.8 | 73.5 |
| 27 | ⊚ | 500< | 123.7 | 82.5 | 91.3 |
| 28 | ⊚ | 500< | 122.3 | 82.3 | 91.1 |
| 29 | ⊚ | 500< | 120.5 | 81.7 | 90.5 |
| 30 | ⊚ | 500< | 122.4 | 82.3 | 91.1 |
| 31 | ⊚ | 500< | 123.7 | 82.6 | 91.3 |
| 32 | ⊚ | 500< | 123.4 | 82.6 | 91.3 |
| 33 | ⊚ | 500< | 122.6 | 82.3 | 91.1 |
| 34 | ⊚ | 500< | 122.5 | 82.2 | 91.0 |
| 35 | ⊚ | 500< | 122.5 | 82.2 | 91.0 |

TABLE 6-continued

| Example | Battery fabric-ability | Heat resistance ° C. | E density mAh/g | Cycle life % | Charge retention rate % |
|---|---|---|---|---|---|
| 36 | ⊚ | 500< | 122.6 | 82.2 | 91.0 |
| 37 | ○ | 500< | 116.5 | 78.6 | 88.7 |
| 38 | ○ | 500< | 114.7 | 76.7 | 88.5 |
| 39 | ○ | 500< | 113.0 | 76.2 | 86.3 |
| 40 | ○ | 500< | 117.0 | 78.8 | 88.1 |
| 41 | ○ | 500< | 117.4 | 78.9 | 89.1 |
| 42 | ⊚ | 500< | 117.5 | 78.9 | 89.4 |

TABLE 7

| Example | Battery fabric-ability | Heat resistance ° C. | E density mAh/g | Cycle life % | Charge retention rate % |
|---|---|---|---|---|---|
| 43 | ○ | 190 | 119.2 | 80.6 | 88.7 |
| 44 | ○ | 190 | 119.3 | 81.1 | 89.6 |
| 45 | ⊚ | 190 | 119.4 | 81.3 | 90.1 |
| 46 | ○ | 210 | 123.3 | 82.1 | 90.0 |
| 47 | ○ | 210 | 123.5 | 82.5 | 90.6 |
| 48 | ⊚ | 210 | 123.5 | 82.7 | 91.3 |
| 49 | ○ | 210 | 123.9 | 82.2 | 90.4 |
| 50 | ○ | 210 | 123.9 | 82.2 | 90.4 |
| 51 | ○ | 210 | 124.0 | 82.5 | 91.2 |
| 52 | ⊚ | 210 | 124.1 | 82.7 | 91.5 |
| 53 | ○ | 210 | 126.8 | 82.9 | 91.1 |
| 54 | ○ | 210 | 126.9 | 83.2 | 91.8 |
| 55 | ⊚ | 210 | 127.0 | 83.4 | 92.0 |
| 56 | ○ | 500< | 116.8 | 78.6 | 88.8 |
| 57 | ○ | 500< | 115.1 | 77.5 | 88.5 |
| 58 | ○ | 500< | 113.1 | 76.3 | 87.8 |
| 59 | ○ | 500< | 117.5 | 79.0 | 88.2 |
| 60 | ○ | 500< | 117.7 | 79.0 | 89.0 |
| 61 | ○ | 500< | 120.7 | 81.6 | 90.1 |
| 62 | ○ | 500< | 119.3 | 80.2 | 89.7 |

TABLE 8

| Example | Battery fabric-ability | Heat resistance ° C. | E density mAh/g | Cycle life % | Charge retention rate % |
|---|---|---|---|---|---|
| 63 | ○ | 500< | 118.0 | 79.7 | 89.4 |
| 64 | ○ | 500< | 120.2 | 81.2 | 89.2 |
| 65 | ○ | 500< | 120.2 | 81.5 | 90.0 |
| 66 | ⊚ | 410 | 123.4 | 82.6 | 91.4 |
| 67 | ⊚ | 400 | 122.2 | 82.3 | 91.1 |
| 68 | ⊚ | 395 | 121.7 | 82.1 | 91.0 |
| 69 | ○ | 410 | 123.9 | 82.2 | 90.4 |
| 70 | ⊚ | 410 | 124.0 | 82.7 | 91.5 |
| 71 | ⊚ | 430 | 127.4 | 83.5 | 92.2 |
| 72 | ⊚ | 420 | 126.3 | 83.2 | 91.9 |
| 73 | ⊚ | 415 | 124.5 | 82.9 | 91.5 |
| 74 | ○ | 500< | 121.1 | 81.7 | 89.5 |
| 75 | ○ | 500< | 121.1 | 82.0 | 90.4 |
| 76 | ⊚ | 500< | 121.2 | 82.1 | 90.8 |
| 77 | ○ | 500< | 122.5 | 81.9 | 89.7 |
| 78 | ○ | 500< | 122.7 | 82.3 | 90.6 |
| 79 | ⊚ | 500< | 122.8 | 82.5 | 91.2 |
| 80 | ○ | 500< | 121.3 | 81.4 | 89.3 |
| 81 | ○ | 500< | 120.0 | 81.1 | 89.0 |
| 82 | ○ | 500< | 118.8 | 79.9 | 88.5 |

TABLE 9

| Example | Battery fabric-ability | Heat resistance ° C. | E density mAh/g | Cycle life % | Charge retention rate % |
|---|---|---|---|---|---|
| 83 | ○ | 500< | 121.7 | 82.1 | 89.8 |
| 84 | ○ | 500< | 124.4 | 82.8 | 90.4 |
| 85 | ○ | 500< | 123.5 | 82.5 | 90.0 |
| 86 | ○ | 500< | 122.1 | 81.7 | 89.7 |
| 87 | ○ | 200 | 119.0 | 80.8 | 88.8 |
| 88 | ○ | 200 | 119.3 | 81.4 | 89.8 |
| 89 | ⊚ | 200 | 119.3 | 81.6 | 90.2 |
| 90 | ○ | 500< | 117.4 | 79.0 | 88.1 |
| 91 | ○ | 500< | 117.4 | 79.3 | 88.9 |
| 92 | ⊚ | 500< | 117.5 | 79.5 | 89.4 |
| 93 | ○ | 500< | 120.1 | 81.3 | 89.0 |
| 94 | ○ | 500< | 120.6 | 81.3 | 89.0 |
| 95 | ○ | 500< | 120.7 | 81.8 | 90.6 |
| 96 | ⊚ | 500< | 120.9 | 82.0 | 90.7 |
| 97 | ○ | 500< | 122.0 | 81.8 | 89.8 |
| 98 | ○ | 500< | 122.2 | 82.1 | 90.6 |
| 99 | ⊚ | 500< | 122.3 | 82.3 | 91.0 |
| 100 | ○ | 500< | 123.6 | 82.5 | 90.0 |
| 101 | ○ | 500< | 126.3 | 82.6 | 91.1 |
| 102 | ○ | 500< | 126.4 | 83.0 | 91.6 |

TABLE 10

| Example | Battery fabric-ability | Heat resistance ° C. | E density mAh/g | Cycle life % | Charge retention rate % |
|---|---|---|---|---|---|
| 103 | ⊚ | 500< | 126.4 | 83.3 | 91.9 |
| 104 | ○ | 500< | 119.4 | 80.8 | 88.6 |
| 105 | ○ | 500< | 119.6 | 81.2 | 89.8 |
| 106 | ⊚ | 500< | 119.8 | 81.4 | 90.3 |
| 107 | ○ | 500< | 123.0 | 82.0 | 90.1 |
| 108 | ○ | 500< | 123.6 | 82.0 | 90.0 |
| 109 | ○ | 500< | 123.6 | 82.4 | 91.0 |
| 110 | ⊚ | 500< | 123.7 | 82.6 | 91.4 |
| 111 | ⊚ | 500< | 120.2 | 81.9 | 90.5 |
| 112 | ⊚ | 500< | 119.1 | 81.3 | 90.0 |
| 113 | ○ | 500< | 123.5 | 82.5 | 90.1 |
| 114 | ⊚ | 500< | 124.2 | 82.8 | 91.6 |
| 115 | ⊚ | 500< | 124.0 | 82.8 | 91.6 |
| 116 | ⊚ | 500< | 123.5 | 82.6 | 91.3 |
| 117 | ⊚ | 500< | 122.2 | 82.3 | 91.1 |
| 118 | ⊚ | 500< | 121.0 | 82.0 | 90.8 |
| 119 | ⊚ | 500< | 123.6 | 82.6 | 91.3 |
| 120 | ○ | 500< | 123.7 | 82.1 | 90.0 |
| 121 | ⊚ | 500< | 127.6 | 83.5 | 92.1 |
| 122 | ⊚ | 500< | 126.2 | 83.2 | 91.9 |
| 123 | ⊚ | 500< | 125.0 | 83.0 | 91.7 |
| 124 | ⊚ | 500< | 127.8 | 83.5 | 92.1 |

TABLE 11

| Comparative Example | Battery fabric-ability | Heat resistance ° C. | Ignition | E density mAh/g | Cycle life % |
|---|---|---|---|---|---|
| 1 | Δ | 135 | x | 127.0 | 83.1 |
| 2 | Δ | 170 | x | 127.1 | 83.1 |
| 3 | ○ | 450 | ○ | 48.9 | 42.3 |
| 4 | x | 240 | ○ | 110.2 | 68.2 |
| 5 | x | 130 | x | 126.8 | 83.1 |
| 6 | x | 500< | ○ | 91.5 | 51.4 |
| 7 | x~Δ | 200 | ○ | 127.0 | 83.0 |
| 8 | x~Δ | 200 | ○ | 126.8 | 82.8 |
| 9 | x | 500< | ○ | 123.1 | 89.4 |
| 10 | Δ | 500< | ○ | 100.1 | 56.7 |
| 11 | x | 500< | ○ | 120.0 | 80.4 |
| 12 | x | 500< | ○ | 120.2 | 80.5 |
| 13 | Δ | 500< | ○ | 43.6 | 41.8 |

TABLE 11-continued

| Comparative Example | Battery fabricability | Heat resistance ° C. | Ignition | E density mAh/g | Cycle life % |
|---|---|---|---|---|---|
| 14 | Δ | 500< | ○ | 93.2 | 49.2 |
| 15 | Δ | 180 | x | 84.5 | 44.0 |

Evaluation

As can be seen from the results of Tables 5–10, the separators for non-aqueous electrolyte batteries made in Examples 1–124 of the present invention comprised a porous base comprising at least one material selected from porous film, woven fabric and nonwoven fabric containing organic fibers, and paper to which an organometallic compound was applied, and, therefore, non-aqueous electrolyte batteries high in energy density and excellent in cycle life were obtained. Moreover, since the organometallic compounds are excellent in heat resistance, no internal short-circuit caused by shrinking or burning of the separators did not occur in the ignition test based on external short-circuit.

Since the separator for non-aqueous electrolyte batteries which was made in Example 1 comprised a polypropylene porous film, it was low in tear strength and penetration strength and was somewhat inferior in rollability with electrodes, and the battery fabricability was somewhat inferior. Moreover, reactivity with the hydrolyzate of organotitanium compound was somewhat inferior and the hydrolyzate of organotitanium compound was not applied uniformly to the inside of the porous film and, hence, the separator was somewhat inferior in heat resistance, but was superior to conventional separators in the heat resistance.

Since the separators for non-aqueous electrolyte batteries made in Examples 2–124 comprised one of woven fabric and non-woven fabric containing organic fibers and paper, they were high in tear strength and penetration strength and superior in rollability with electrodes, and the battery fabricability was excellent. Furthermore, the organometallic compounds were applied to the inside of the separators, and, hence, the separators were excellent in heat resistance and internal short-circuit caused by melting or burning of the separators could be prevented in the ignition test based on external short-circuit.

The separators for non-aqueous electrolyte batteries made in Examples 17 and 19–39 had both the shutdown function of the polypropylene porous film and the heat resistance of the woven fabric, nonwoven fabric and paper and were high in safety. Besides, since the layers were bonded to each other, no slipping of the layers occurred when rolled together with electrodes and the battery fabricability was superior.

The separators for non-aqueous electrolyte batteries made in Examples 40–42 were excellent in heat resistance since they contained paper and were conspicuously high in tear strength and penetration strength. Furthermore, they were superior in rollability with electrodes and the battery fabricability was excellent.

The separator for non-aqueous electrolyte batteries made in Example 18 comprised a woven fabric and a porous film as merely laminated. Therefore, when it was rolled together with electrodes, the layers sometimes slipped off and the battery fabricability was inferior.

The separators for non-aqueous electrolyte batteries made in Examples 3–16 and 19–124 comprised a nonwoven fabric or paper alone or were composites comprising a combination thereof and were high in tear strength and penetration strength and superior in rollability with electrodes, and the battery fabricability was excellent.

Since the separators for non-aqueous electrolyte batteries made in Examples 4, 10–24, 27–39, 41, 42, 44, 45, 47, 48, 51, 52, 53, 55–58, 60–63, 65–68, 70–73, 75, 76, 78, 79, 88, 89, 91, 92, 95, 96, 98, 99, 102, 103, 105, 106, 109, 110, 111, 112, 114, 115, 116–119 and 121–124 were subjected to pressing or hot pressing, they were superior in surface smoothness and adhesion to the electrodes, high in tear strength and penetration strength, and good in rollability with electrodes. Thus, the battery fabricability was excellent. Furthermore, since the thickness can be made thin, the electrode area in the batteries could be gained. Particularly, when they were subjected to hot pressing, these effects were very high.

Since the separators for non-aqueous electrolyte batteries made in Examples 1, 4, 10–39, 41, 42, 45, 48, 52, 55–58, 60–63, 65–68, 70–73, 75, 76, 78, 79, 88, 89, 91, 92, 95, 96, 98, 99, 102, 103, 105, 106, 109, 110, 111, 112, 114, 115, 116–119 and 121–124 had a maximum pore diameter of 20 μm or less measured by the bubble point method specified in ASTM F-316-80, they were excellent in electrolyte retention, and the batteries could be stably repeatedly charged and discharged and thus were excellent in cycle life.

Among them, since the separators for non-aqueous electrolyte batteries made in Examples 4, 10–24, 27–39, 41, 42, 45, 48, 52, 55–58, 60–63, 65–68, 70–73, 75, 76, 78, 79, 88, 89, 91, 92, 95, 96, 98, 99, 102, 103, 105, 106, 109, 110, 111, 112, 114, 115, 116–119 and 121–124 contained a nonwoven fabric or paper having a maximum pore diameter of 20 μm or less measured by the bubble point method specified in ASTM F-316-80, they were especially excellent in electrolyte retention, and the batteries could be stably repeatedly charged and discharged and thus were excellent in cycle life.

Since the separators for non-aqueous electrolyte batteries made in Examples 3, 4, 8–16, 18–36, 40–55 and 64–124 contained a nonwoven fabric, they were less in swelling after immersed in the electrolyte and the electrode area incorporated in the batteries could be gained.

Since the separators for non-aqueous electrolyte batteries made in Examples 8–16, 18–36, 63–86 and 90–124 contained inorganic fibers or contained organic fibers at least one of which were heat resistant organic fibers having a melting point or heat decomposition temperature of 250° C. or higher, they were excellent in heat resistance and ignition of the non-aqueous electrolyte batteries could be prevented in the external short-circuit test.

Since the separators for non-aqueous electrolyte batteries made in Examples 8–15 and 18–26 were high in sodium oxide content in the micro-glass fibers, the cycle life and the battery shelf stability were somewhat inferior.

On the other hand, since the separators for non-aqueous electrolyte batteries made in Examples 27–32, 34, 35, 63–79, 90–110 and 116–124 contained substantially no sodium oxide in the alumina fibers or micro-glass fibers, the cycle life and the battery shelf stability were excellent.

In the separators for non-aqueous electrolyte batteries made in Examples 27, 30–35, 66–73, 80–96 and 104–124, at least a part of the organic fibers were fibrillated to a fiber diameter of 1 μm or less, and therefore they were high in tear strength and penetration strength and excellent in rollability with electrodes.

Since the separators for non-aqueous electrolyte batteries made in Examples 30, 32, 34, 36, 40–55, 77–79, 87–103 and 111–124 contained polyvinyl alcohol, they were especially high in strength, could be made thinner and were good in rollability with electrodes, and the battery fabricability was excellent.

In the separators for non-aqueous electrolyte batteries made in Examples 1–16, the porous base comprising one of porous film, woven fabric or nonwoven fabric containing organic fibers or paper was allowed to contact with a solution of organometallic compound by impregnation, coating or spraying, followed by drying or curing with heating to apply the organometallic compound thereto, they were excellent in energy density and cycle life.

In the separators for non-aqueous electrolyte batteries made in Examples 17–42, at least one porous base (A) selected from porous film, woven fabric or nonwoven fabric containing organic fibers and paper or (A) and porous base (B) containing no organic fibers were allowed to contact with a solution of organometallic compound by impregnation, coating or spraying, followed by drying or curing with heating to apply the organometallic compound thereto, and thereafter a composite (C) was made from the combination of (A) or the combination of (A) and (B), or a composite (C) was made from a combination of at least one porous base (A) selected from porous film, woven fabric or nonwoven fabric containing organic fibers and paper or a combination of (A) and porous base (B) containing no organic fibers and thereafter the composite (C) was allowed to contact with a solution of organometallic compound by impregnation, coating or spraying, followed by drying or curing with heating to apply the organometallic compound thereto, they were excellent in energy density and cycle life.

In the separators for non-aqueous electrolyte batteries made in Examples 43–48, 56–58, 64–68, 74–76, 77–82, 87–92, 97–99, 104–106, 111, 112 and 116–119, a wet sheet obtained by wet paper making process or this sheet after dried was allowed to contact with a solution of organometallic compound by impregnation, coating or spraying, followed by drying or curing with heating to apply the organometallic compound thereto, the batteries were excellent in energy density and cycle life.

Since the separators for non-aqueous electrolyte batteries made in Examples 49, 59, 69, 83, 93, 100, 113 and 120 were obtained by subjecting a fiber slurry containing an organometallic compound to beating or maceration, and then subjecting the fiber slurry alone or a mixed slurry of the fiber slurry and other fiber slurry to wet paper making process, followed by drying or curing with heating to apply the organometallic compound thereto, the blocking effect for polar groups which adversely affect the battery characteristics was high and the higher energy density and the better cycle life were obtained.

Among them, since the separators for non-aqueous electrolyte batteries made in Examples 83 and 93 contained organic fibers at least a part of which were fibrillated to a fiber diameter of 1 $\mu$m or less and which had polar groups adversely affecting the battery characteristics, the blocking effect for the polar groups was enhanced by applying the organometallic compound by the above method.

Since the separators for non-aqueous electrolyte batteries made in Examples 50–55, 60–63, 70–73, 83–86, 93–96, 100–103, 107–110, 113–115 and 120–124 were obtained by subjecting a fiber slurry containing an organometallic compound to beating or maceration, then subjecting the fiber slurry alone or a mixed slurry of the said fiber slurry and other fiber slurry to wet paper making process, and allowing the resulting wet sheet or the sheet after dried to contact with a solution of organometallic compound by impregnation, coating or spraying, followed by drying or curing with heating to apply the organometallic compound thereto, the blocking effect for polar groups adversely affecting the battery characteristics was the highest, and further higher energy density and excellent cycle life were obtained.

Among them, since the separators for non-aqueous electrolyte batteries made in Examples 83–86, 93–96 and 107–110 contained fibers at least a part of which were fibrillated to a fiber diameter of 1 $\mu$m or less and which had polar groups adversely affecting the battery characteristics, the blocking effect for the polar groups was great by applying the organometallic compound by the above method.

As to the separators for non-aqueous electrolyte batteries made in Examples 43–48 and 50–55, when the method of treating the wet sheet with the solution of organometallic compound was compared with the method of treating the sheet after dried, the latter method more easily applied the organometallic compound and gave larger blocking effect for the polar groups adversely affecting the battery characteristics, and the energy density tends to increase.

As to the separators for non-aqueous electrolyte batteries made in Examples 5–7, 10–15, 27–29, 34–39, 56–58, 61–63, 66–68, 71–73, 80–82, 84–86, 111, 112, 114–118 and 121–123, when a comparison was made on the treating methods of impregnation, coating and spraying, the impregnation, coating and spraying in this order resulted in the more uniform application of the organometallic compound, and the energy density had the tendency to increase.

On the other hand, as can be seen from the results of Table 11, the separator for non-aqueous electrolyte batteries of Comparative Example 1 was low in tear strength and penetration strength and somewhat inferior in rollability with electrodes, and the battery fabricability was somewhat inferior. Moreover, since the separator comprised polyethylene, it was somewhat inferior in heat resistance and, in some cases, ignited in the ignition test due to external short-circuit.

The separator for non-aqueous electrolyte batteries of Comparative Example 2 was a composite, but comprised only polypropylene. Therefore, it was somewhat inferior in heat resistance and, in some cases, ignited in the external short-circuit test.

The separator for non-aqueous electrolyte batteries of Comparative Example 3 contained Manila hemp having polar groups adversely affecting the battery characteristics, hence it was much inferior in energy density and cycle life.

The separator for non-aqueous electrolyte batteries of Comparative Example 4 was a nonwoven fabric comprising 100% of micro-fibrillated fibers of an organic synthetic polymer having an average fiber length of 0.2–1.5 mm and an average fiber diameter of 0.05–1 $\mu$m, and, therefore, binding force between the micro-fibrils was weak, resulting in low tear strength and penetration strength and deteriorated battery fabricability.

The separator for non-aqueous electrolyte batteries of Comparative Example 5 was also a nonwoven fabric comprising 100% of micro-fibrillated fibers of an organic synthetic polymer having an average fiber length of 0.2–1.5 mm and an average fiber diameter of 0.05–1 $\mu$m, and, therefore, binding force between the micro-fibrils was weak, resulting in low tear strength and penetration strength and deteriorated battery fabricability. In addition, it comprised polyethylene and was somewhat inferior in heat resistance and, in some cases, ignited in the ignition test based on external short-circuit.

The separator for non-aqueous electrolyte batteries of Comparative Example 6 comprised a glass fiber nonwoven fabric, and hence was excellent in heat resistance, but high in stiffness owing to the effect of binder to cause slipping or formation of space at the time of rolling together with electrodes, and the battery fabricability was inferior. Furthermore, since the binder physically covered the glass fibers, silanol group contained in the glass fibers could not be completely blocked to cause deterioration in energy density and cycle life.

The separator for non-aqueous electrolyte batteries of Comparative Example 7 was low in tear strength and penetration strength and somewhat inferior in rollability with electrodes and the battery fabricability was inferior.

In the separator for non-aqueous electrolyte batteries of Comparative Example 8, the layers of the composite were not bonded to each other, and, therefore, when it was rolled together with electrodes, slipping or formation of spaces was apt to occur, and the battery fabricability was somewhat inferior.

The separator for non-aqueous electrolyte batteries of Comparative Example 9 contained a titanium oxide film and, hence, was excellent in heat resistance, but since the layers were not bonded to each other, the titanium oxide film readily fell off, and the tear strength and penetration strength were low, and the battery fabricability was bad.

The separator for non-aqueous electrolyte batteries of Comparative Example 10 was somewhat inferior in energy density and cycle life due to the water contained in silica gel in a slight amount.

Since the separators for non-aqueous electrolyte batteries of Comparative Examples 11 and 12 comprised only glass fibers, they were low in folding endurance and penetration strength, and when they were rolled together with electrodes, ply separation or breakage were apt to occur, and the battery fabricability was inferior.

In the separators for non-aqueous electrolyte batteries of Comparative Examples 13–15, the organometallic compound was not applied thereto and, therefore, the energy density and the cycle life were very bad due to the effect of hydroxyl group or silanol group.

Industrial Applicability

The separator for non-aqueous electrolyte batteries according to the present invention comprises a porous base comprising at least one material selected from a porous film, a woven fabric or nonwoven fabric containing organic fibers and a paper to which an organometallic compound is applied. Therefore, the polar groups which adversely affect the battery characteristics are blocked and the batteries are excellent in energy density and cycle life. Further, since the organometallic compound is superior in heat resistance, even when electrodes are externally short-circuited and generate heat, shrinking or burning of the separator, especially shrinking in the Z direction, caused by melting of fibers can be prevented, and no internal short-circuit due to contact between electrodes occurs and ignition of the non-aqueous electrolyte batteries can be inhibited. In the case of the porous base in the present invention being a composite comprising a combination of a porous film, a woven fabric or nonwoven fabric containing organic fibers and a paper or a combination of at least one of these materials and a porous base containing no organic fibers, a separator for non-aqueous electrolyte batteries which has multi-functions can be obtained. When the porous film has a maximum pore diameter of 10 μm or less as measured by the bubble point method specified in ASTM F-316-80, dendrites or electrode active materials falling off can hardly penetrate the separator.

When the porous base in the present invention contains a nonwoven fabric or a paper, there is obtained a separator for non-aqueous electrolyte batteries which is high in tear strength or penetration strength, superior in rollability with electrodes and can inhibit internal short-circuit caused by penetration of dendrites of electrode active materials falling off through the separator. When the nonwoven fabric or paper used in the present invention has a maximum pore diameter of 20 μm or less as measured by the bubble point method specified in ASTM F-316-80, there is obtained a separator for non-aqueous electrolyte batteries which is excellent in electrolyte retention, and can provide excellent cycle life and battery shelf stability. Especially, when the porous base in the present invention contains a nonwoven fabric, there is obtained a separator for non-aqueous electrolyte batteries which is excellent in electrolyte retention, less in swelling after immersed in the electrolyte, and is excellent in dimensional stability. When the porous base in the present invention contains inorganic fibers, dimensional stability at high temperatures is improved, and, hence, a separator for non-aqueous electrolyte batteries excellent especially in heat resistance can be obtained. Furthermore, in case the inorganic fibers are silica glass containing 99% by weight or more of silicon dioxide or micro-glass fibers comprising E glass containing 1% by weight or less of sodium oxide, particularly the battery shelf stability is excellent. When at least one kind of the organic fibers used in the present invention are heat resistant organic fibers having a melting point or heat decomposition temperature of 250° C. or higher, the dimensional stability at high temperatures is improved and a separator for non-aqueous electrolyte batteries which is excellent in heat resistance is obtained. When at least a part of the organic fibers contained in the porous base in the present invention are fibrillated to a fiber diameter of 1 μm or less or the organic fibers contain polyvinyl alcohol, a separator for non-aqueous electrolyte batteries high in tear strength or penetration strength, superior in rollability with electrodes and excellent in battery fabricability is obtained.

Especially when polyvinyl alcohol is contained, a separator for non-aqueous electrolyte batteries which is thinner and uniform, and good in adhesion to electrodes is obtained. When the separator for non-aqueous electrolyte batteries in the present invention is subjected to pressing or hot pressing, surface smoothness of the separator is improved, and especially when it is subjected to hot pressing, since mechanical strength and surface smoothness are much improved, rollability with electrodes is very good and battery fabricability is very excellent. When the separator for non-aqueous electrolyte batteries of the present invention is made by allowing a porous base comprising at least one material selected from porous film, woven fabric or nonwoven fabric containing organic fibers and paper to contact with a solution of organometallic compound by impregnation, coating or spraying, followed by drying or curing with heating to apply the organometallic compound to the porous base, the polar groups which adversely affect the battery characteristics can be blocked and non-aqueous electrolyte batteries excellent in energy density and cycle life can be obtained. When the separator for non-aqueous electrolyte batteries of the present invention is made by previously allowing at least one porous base (A) selected from porous film, woven fabric or nonwoven fabric containing organic fibers and paper or (A) and porous base (B) containing no organic fibers to contact with a solution of organometallic compound by impregnation, coating or spraying, followed by drying or curing with heating to apply the organometallic compound thereto, and thereafter making a composite (C) comprising the combination of (A) or the combination of (A) and (B), the polar groups which adversely affect the battery characteristics can be blocked and by using the resulting separator, non-aqueous electrolyte batteries excellent in energy density and cycle life can be obtained.

When the separator for non-aqueous electrolyte batteries of the present invention is made by making a composite (C) comprising a combination of at least one porous base (A) selected from porous film, woven fabric or nonwoven fabric containing organic fibers and paper or a combination of (A) and porous base (B) containing no organic fibers and thereafter allowing the composite (C) to contact with a solution of organometallic compound by impregnation, coating or spraying, followed by drying or curing with heating to apply the organometallic compound thereto, the polar groups which adversely affect the battery characteristics can be blocked and by using the resulting separator, non-aqueous electrolyte batteries excellent in energy density and cycle life can be obtained. In the case of the porous base in the present invention being made by wet paper making process, there can be obtained a separator for non-aqueous electrolyte batteries which is high in tear strength and thrust strength, good in rollability with electrodes and excellent in battery fabricability.

When the separator for non-aqueous electrolyte batteries of the present invention is made by allowing a wet sheet obtained by wet paper making process or the sheet after dried to contact with a solution of organometallic compound by impregnation, coating or spraying, followed by drying or curing with heating to apply the organometallic compound to the sheet, the polar groups which adversely affect the battery characteristics can be blocked and by using the resulting separator, non-aqueous electrolyte batteries excellent in energy density and cycle life can be obtained. When the separator for non-aqueous electrolyte batteries of the present invention is made by subjecting a fiber slurry containing an organometallic compound to beating or maceration and then subjecting the fiber slurry alone or a mixed slurry of the fiber slurry with other fiber slurry to wet paper making process, followed by drying or curing by heating to apply the organometallic compound to the sheet, the organometallic compound is also uniformly applied to the binding points of the fibers and the effect to block the polar groups which adversely affect the battery characteristics is great. When the separator for non-aqueous electrolyte batteries of the present invention is made by subjecting a fiber slurry containing an organometallic compound to beating or maceration, then subjecting the fiber slurry alone or a mixed slurry of the fiber slurry with other fiber slurry to wet paper making process, and allowing the resulting wet sheet or the sheet after dried to contact with a solution of organometallic compound by impregnation, coating or spraying, followed by drying or curing with heating to apply the organometallic compound to the sheet, the effect to block the polar groups which adversely affect the battery characteristics is the highest and hence by using the resulting separator, non-aqueous electrolyte batteries higher in energy density and further excellent in cycle life can be obtained. Especially, when the separator for non-aqueous electrolyte batteries of the present invention contains organic fibers at least a part of which are fibrillated to a fiber diameter of 1 $\mu$m or less and which have the polar groups adversely affecting the battery characteristics, the polar groups of the fibers can be efficiently blocked.

The separator for non-aqueous electrolyte batteries of the present invention can be reduced in its pore diameter by subjecting it to pressing or hot pressing, and especially the pore diameter can be further reduced by the hot pressing. Furthermore, by the hot pressing, heat-fusible fibers, organic fibers low in melting point or resin contained in the separator form a film. Therefore, a separator less in swelling after immersed in electrolyte and excellent in dimensional stability can be obtained, and hence by using this separator, non-aqueous electrolyte batteries of high capacity can be obtained.

What is claimed is:

1. A battery separator which comprises a porous base containing at least one member selected from a nonwoven fabric or a paper, the nonwoven fabric and the paper containing an organic fiber fibrillated to a fiber diameter of 1 $\mu$m or less, and an organometallic compound impregnated, coated or sprayed to the porous base, the resulting separator being for non-aqueous electrolyte batteries, the nonwoven fabric and the paper being made by wet paper making process, and wherein the porous base has a maximum pore diameter of 20 $\mu$m or less as measured by bubble point method specified in ASTM F-316-80.

2. The separator according to claim 1, wherein the porous film has a maximum pore diameter of 10 $\mu$m or less as measured by bubble point method specified in ASTM F-316-80.

3. The separator according to claim 1, wherein the nonwoven fabric or paper has a maximum pore diameter of 20 $\mu$m or less as measured by bubble point method specified in ASTM F-316-80.

4. The separator according to claim 1, wherein the porous base contains an inorganic fiber.

5. The separator according to claim 4, wherein the inorganic fiber is at least one fiber selected from micro-glass fiber, alumina fiber and rock wool.

6. The separator according to claim 5, wherein the micro-glass fiber comprises a silica glass containing 99% by weight or more of silicon dioxide (in terms of $SiO_2$) or an E glass containing 1% by weight or less of sodium oxide (in terms of $Na_2O$).

7. The separator according to claim 1, wherein at least one organic fiber is a heat resistant organic fiber having a melting point or heat decomposition temperature of 250° C. or higher.

8. The separator according to claim 1, wherein the organic fiber at least a part of which is fibrillated to a fiber diameter of 1 $\mu$m or less is at least one fiber selected from vegetable fiber, vegetable fiber pulp, bacteria cellulose produced by micro-organisms, rayon, polyolefin fiber, polyamide fiber, aramid fiber and polyarylate fiber.

9. The separator according to claim 1, which contains polyvinyl alcohol.

10. The separator according to claim 1, wherein the porous base is subjected to pressing or hot pressing.

11. The separator according to claim 1, wherein the organometallic compound is at least one compound selected from organosilicon compound, organotitanium compound, organoaluminum compound, organozirconium compound and organozirco-aluminate compound.

12. The separator according to claim 1, wherein the organometallic compound is an organosilicon compound.

13. The separator according to claim 12, wherein the organosilicon compound is at least one compound selected from organosilane or organopolysiloxane having at least one hydrolyzable group or functional group selected from chlorine group, fluorine group, acetoxy group, alkoxy group, vinyl group, amino group, epoxy group, mercapto group and methacryl group.

14. A non-aqueous electrolyte battery made using the separator according to claim 1.

15. A battery separator according to claim 1, wherein the organic fiber has a fiber length of 5 mm or less.

* * * * *